US009694506B2

(12) United States Patent

Whitney

(10) Patent No.: US 9,694,506 B2
(45) Date of Patent: Jul. 4, 2017

(54) FOOD-PRODUCT SLICERS HAVING FOOD-PRODUCT CRADLES

(71) Applicant: Edlund Company, LLC, Burlington, VT (US)

(72) Inventor: Ryan S. Whitney, Essex Junction, VT (US)

(73) Assignee: Edlund Company, LLC, Burlington, VT (US)

( * ) Notice: Subject to any disclaimer, the term of this patent is extended or adjusted under 35 U.S.C. 154(b) by 96 days.

(21) Appl. No.: 14/163,918

(22) Filed: Jan. 24, 2014

(65) Prior Publication Data

US 2014/0208908 A1 Jul. 31, 2014

Related U.S. Application Data

(60) Provisional application No. 61/756,668, filed on Jan. 25, 2013.

(51) Int. Cl.
*B26D 7/00* (2006.01)
*B62D 1/02* (2006.01)
(Continued)

(52) U.S. Cl.
CPC ................ *B26D 7/01* (2013.01); *B26D 1/03* (2013.01); *B26D 5/10* (2013.01); *B26D 5/16* (2013.01);
(Continued)

(58) Field of Classification Search
CPC ... B26D 7/01; B26D 5/10; B26D 5/16; B26D 7/0608; B26D 1/03; B26D 2003/287;
(Continued)

(56) References Cited

U.S. PATENT DOCUMENTS 236,178 A 1/1881 Rice
269,835 A 1/1883 De Puy et al.
(Continued)

FOREIGN PATENT DOCUMENTS

DE 3629168 2/1988
JP 10016930 A * 1/1998

OTHER PUBLICATIONS

Office Action dated Oct. 8, 2015, issued in connection with U.S. Appl. No. 14/163,858, filed Jan. 24, 2014.
(Continued)

*Primary Examiner* — Ghassem Alie
*Assistant Examiner* — Bharat C Patel
(74) *Attorney, Agent, or Firm* — Downs Rachlin Martin PLLC

(57) ABSTRACT

A food product slicer that includes a blade set and a food-product cradle for supporting a food-product in spaced relation to the blade set. In some embodiments, the cradle is configured to inhibit a user from contacting blades in the blade set in order to prevent injury. In some embodiments, the cradle is incorporated monolithically with a food-product pusher. Food-product cradles of the present disclosure can be enhanced with product-stabilizers that assist in keeping a food-product from moving within the cradles. Food-product cradles of the present disclosure can also be enhanced with side members to created housed cradles. The cradles may be made of fingers spaced from one another to allow the cradles to extend into and/or through the blade set.

15 Claims, 20 Drawing Sheets

(51) Int. Cl.

| | |
|---|---|
| ***B26B 3/00*** | (2006.01) |
| ***B26D 7/01*** | (2006.01) |
| ***B26D 7/06*** | (2006.01) |
| ***B26D 1/03*** | (2006.01) |
| ***B26D 5/16*** | (2006.01) |
| ***B26D 5/10*** | (2006.01) |
| *B26D 3/28* | (2006.01) |

(52) U.S. Cl.
CPC ...... *B26D 7/0608* (2013.01); *B26D 2003/287* (2013.01); *Y10T 83/654* (2015.04); *Y10T 83/66* (2015.04); *Y10T 83/6606* (2015.04); *Y10T 83/9498* (2015.04)

(58) Field of Classification Search
CPC ... Y10T 83/66; Y10T 83/6606; Y10T 83/654; Y10T 83/9498
USPC .... 83/167, 466.1, 597, 856–858, 411.1, 648, 83/932; 99/596, 513; 30/299, 302, 114
See application file for complete search history.

(56) References Cited

U.S. PATENT DOCUMENTS 995,491 A 6/1911 Smythe
1,263,151 A 4/1918 Topalian
1,443,281 A * 1/1923 Schoenborn ........... A01C 1/005 83/425.3
1,656,415 A 4/1926 Breitkrentz
1,626,550 A 8/1926 Miller
1,685,245 A 9/1928 Russo
1,703,154 A * 2/1929 Lanzkron ............. B26B 29/063 269/87.2
1,771,456 A 5/1929 Alexander
1,748,997 A * 3/1930 Rentos ................... B26D 1/553 125/17
1,764,235 A * 6/1930 Wilmking ............. B26B 29/063 83/467.1
2,120,375 A 6/1938 Shaver et al.
2,283,030 A 5/1942 Bakewell
2,346,282 A * 4/1944 Watts ..................... B26D 3/185 30/304
2,405,385 A * 8/1946 Wingate ................. B26D 1/553 30/355
2,407,924 A * 9/1946 Garfunkel .............. B26D 3/185 248/224.61
2,466,121 A 4/1949 Norman
2,592,657 A * 4/1952 Cierley ................ A21C 11/106 83/543
2,836,212 A * 5/1958 Shaw ..................... B26D 3/185 29/446
3,109,468 A 11/1963 Lamb et al.
3,258,046 A 6/1966 Lackerman
3,369,582 A * 2/1968 Giangiulio ............... B26D 1/03 83/425.3
3,561,511 A * 2/1971 Kummer ................ B26D 1/553 83/597
3,605,839 A 9/1971 Gerson
3,605,840 A * 9/1971 Morrett .................... B26D 3/26 83/425.3
3,774,490 A * 11/1973 Gerson .................. B26D 1/553 83/425.3
3,807,266 A * 4/1974 Camp ...................... B26D 1/11 83/404.4
3,886,827 A 6/1975 McCarthy
3,890,867 A 6/1975 Wilson
3,924,501 A 12/1975 Cohen et al.
3,942,399 A 3/1976 Giangiulio
3,948,132 A * 4/1976 Camp ...................... B26D 1/03 83/425.3
4,040,319 A 8/1977 Taniyama
4,041,822 A * 8/1977 Gabel ...................... B26D 1/15 144/245.3
4,044,663 A * 8/1977 Straw ....................... A23N 5/00 99/577
4,059,037 A 11/1977 Gerson et al.
4,062,260 A * 12/1977 Steinhogl ................ B26B 5/008 83/404.3
4,137,807 A 2/1979 Schaumberg
4,144,784 A * 3/1979 Jones ....................... B26D 7/22 83/425.3
4,145,941 A * 3/1979 Davis ....................... B26D 1/03 83/167
4,184,397 A * 1/1980 Jones ....................... B26D 1/03 83/425.3
4,254,678 A * 3/1981 Steiner ..................... B26D 7/22 83/425.3
4,276,795 A 7/1981 Rasmussen et al.
4,302,997 A * 12/1981 Jones ....................... B26D 1/03 83/425.2
4,329,895 A * 5/1982 Perini ...................... B26D 1/10 83/174
4,346,634 A 8/1982 Jones
4,383,459 A 5/1983 Peters
4,434,694 A 3/1984 Scharsig
4,436,011 A * 3/1984 Jones ....................... B26D 1/03 83/425.3
4,559,856 A 12/1985 Pettus
4,567,801 A * 2/1986 Jones ....................... B26D 1/03 83/404.3
4,589,318 A * 5/1986 Kanski ..................... B26D 1/03 83/409.1
4,625,607 A * 12/1986 Maillez .................... B26D 1/30 30/114
4,936,204 A 6/1990 Whitmarsh
4,976,029 A 12/1990 Kennedy
5,009,141 A 4/1991 Julian et al.
5,125,308 A 6/1992 Mendenhall
5,245,902 A * 9/1993 Pereira .................. B26D 3/185 83/425.3
5,287,784 A * 2/1994 Brockett ................. A47J 47/00 83/746
6,435,080 B1 * 8/2002 Zarlengo ............... A47J 19/005 100/103
6,553,885 B2 4/2003 Cole et al.
6,558,244 B1 * 5/2003 Nedelka ................. B26D 3/185 452/149
6,799,496 B2 10/2004 Verhaeghe
7,191,691 B2 3/2007 Kaposi
7,216,574 B2 * 5/2007 Woods ..................... B26D 3/30 30/278
7,249,550 B1 * 7/2007 Thune, Jr. ............ A21C 11/106 30/114
7,429,010 B2 9/2008 McCormick et al.
7,444,909 B2 11/2008 Repac et al.
7,587,968 B1 * 9/2009 Roberts .................. B26D 3/185 83/404.3
7,861,629 B2 1/2011 Brander et al.
7,882,641 B2 2/2011 Repac
7,984,554 B2 * 7/2011 Aby-Eva ................. A47J 9/003 30/116
D662,790 S * 7/2012 Rugprayoon .................. D7/674
8,272,631 B2 * 9/2012 Gannon .................. A47J 17/10 269/153
8,438,737 B2 5/2013 Lo et al.
8,739,669 B2 * 6/2014 Engdahl ................. B26D 1/553 83/404.3
9,186,806 B2 * 11/2015 Holcomb .................. B26B 3/04
2004/0237741 A1 * 12/2004 Stinnett .................. B26D 1/553 83/425.3
2006/0185488 A1 * 8/2006 Short ..................... B26D 1/553 83/581.1
2006/0225547 A1 10/2006 Stanojevic et al.
2007/0095191 A1 5/2007 Moss et al.
2009/0193952 A1 8/2009 Farid et al.
2010/0313724 A1 * 12/2010 Farid ...................... B26D 3/185 83/123
2011/0000351 A1 1/2011 Holcomb et al.
2011/0072985 A1 3/2011 Gaus
2012/0055303 A1 3/2012 Repac

(56) References Cited

U.S. PATENT DOCUMENTS

| | | | |
|---|---|---|---|
| 2012/0103152 | A1 | 5/2012 | Roes |
| 2012/0231717 | A1 | 9/2012 | Zean et al. |
| 2014/0208909 | A1 | 7/2014 | Whitney |
| 2014/0208910 | A1 | 7/2014 | Whitney |
| 2014/0208911 | A1 | 7/2014 | Whitney |
| 2014/0208917 | A1 | 7/2014 | Whitney |

OTHER PUBLICATIONS

Office Action dated Oct. 2, 2015, issued in connection with U.S. Appl. No. 14/163,897, filed Jan. 24, 2014.
Office Action dated Oct. 9, 2015, issued in connection with U.S. Appl. No. 14/163,934, filed Jan. 24, 2014.
Office Action dated Oct. 19, 2015, issued in connection with U.S. Appl. No. 14/163,947, filed Jan. 24, 2014.
Restriction Requirement dated Jul. 8, 2015, issued in connection with U.S. Appl. No. 14/163,858, filed Jan. 24, 2014.
Response to Restriction Requirement dated Sep. 4, 2015, issued in connection with U.S. Appl. No. 14/163,858, filed Jan. 24, 2014.
Restriction Requirement dated Aug. 5, 2015, issued in connection with U.S. Appl. No. 14/163,897, filed Jan. 24, 2014.
Response to Restriction Requirement dated Sep. 4, 2015, issued in connection with U.S. Appl. No. 14/163,897, filed Jan. 24, 2014.
Restriction Requirement dated Jul. 28, 2015, issued in connection with U.S. Appl. No. 14/163,934, filed Jan. 24, 2014.
Response to Restriction Requirement dated Sep. 4, 2015, issued in connection with U.S. Appl. No. 14/163,934, filed Jan. 24, 2014.
Restriction Requirement dated Aug. 5, 2015, issued in connection with U.S. Appl. No. 14/163,947, filed Jan. 24, 2014.
Response to Restriction Requirement dated Sep. 4, 2015, issued in connection with U.S. Appl. No. 14/163,947, filed Jan. 24, 2014.

* cited by examiner

FOOD-PRODUCT SLICERS HAVING FOOD-PRODUCT CRADLES

RELATED APPLICATION DATA

This application claims the benefit of priority of U.S. Provisional Patent Application Ser. No. 61/756,668, filed on Jan. 25, 2013, and titled "Food-Product Slicers and Enhancements Therefor," which is incorporated herein by reference in its entirety.

This application is related to the following nonprovisional applications filed herewith:

- U.S. patent application Ser. No. 14/163,858, filed on Jan. 24, 2014, and titled "Food-Product Slicers Having a Double-Beveled Blade Arrangement, and Features Usable Therewith";
- U.S. patent application Ser. No. 14/163,934 filed on Jan. 24, 2014, and titled "Multilevel Blade Cartridges For Food-Product Slicers and Food-Product Slicers Incorporating Multilevel Blade Cartridges";
- U.S. patent application Ser. No. 14/163,937 filed on Jan. 24, 2014, and titled "Food-Product Slicers Having Cammed Slicing-Cleaving Actions"; and
- U.S. patent application Ser. No. 14/163,947 filed on Jan. 24, 2014, and titled "Product Pushers For Food-Product Slicers and Food-Product Slicers Including Such Product Pushers".

Each of the foregoing related applications is incorporated herein by reference in its entirety.

FIELD OF THE INVENTION

The present invention generally relates to the field of food-product slicers. More particularly, the present invention is directed to food-product slicers having food-product cradles.

BACKGROUND

Various food-product slicers are available in the marketplace for slicing an assortment of food-products. One general type of food-product slicer is the type in which the food-product is thrust into a set of blades that slice the product into multiple slices, and this type of food-product slicer generally falls into one or the other of two categories, soft-food-product slicers and hard-food-product slicers. Examples of soft food-products (at room temperature) include ripe tomatoes and cheeses that can be characterized as rubbery, such as mozzarella cheese. Examples of hard food-products (again, at room temperature) include onions, apples, and carrots. Conventional soft- and hard-product slicers typically cannot adequately handle the opposite type of product, i.e., typical conventional soft-product slicers cannot handle hard products, and typical conventional hard-product slicers cannot handle soft products.

Conventional soft-product mechanical slicers are often horizontally actuated slicers in which the product being sliced is thrust into a set of vertically spaced blades that are aligned vertically with one another using a pusher assembly that includes a pusher head having a plurality of horizontal vertically-spaced plates spaced apart to move between the horizontal blades. The horizontal blades are usually skewed relative to the thrust axis of the pusher assembly and, therefore, are relatively long.

Typical conventional hard-product mechanical slicers (which more precisely work by cleaving action) are often generally vertically actuated devices in which the product being cut is thrust into a set of spaced blades along a thrust axis that is perpendicular to a plane containing the blade edges on any blade level. This results in a cleaving action. Mechanical hard-product slicers use a pusher assembly that includes a pusher head having a plurality of horizontally-spaced plates spaced apart to move between the vertical blades.

SUMMARY

In an implementation, the present disclosure is directed to a food-product slicer for slicing a food product, which includes a blade set designed and configured for cutting a food-product into multiple slices; a food-product pusher designed, configured, and located to resistingly engage the food-product when the food-product is engaged with the blade set during cutting operations; and a food-product cradle designed, configured, and located to hold the food-product in predetermined relation to the food-product pusher and in spaced relation to the blade set prior to the cutting operations.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 38:
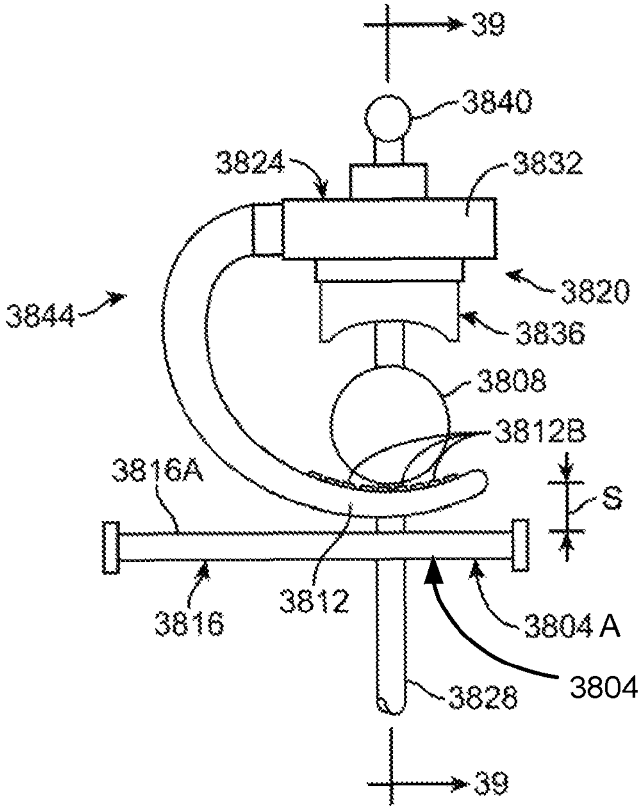
FIG. 38 is a side view of a food-product slicer of the present invention that includes a food-product cradle.
Figure 39:
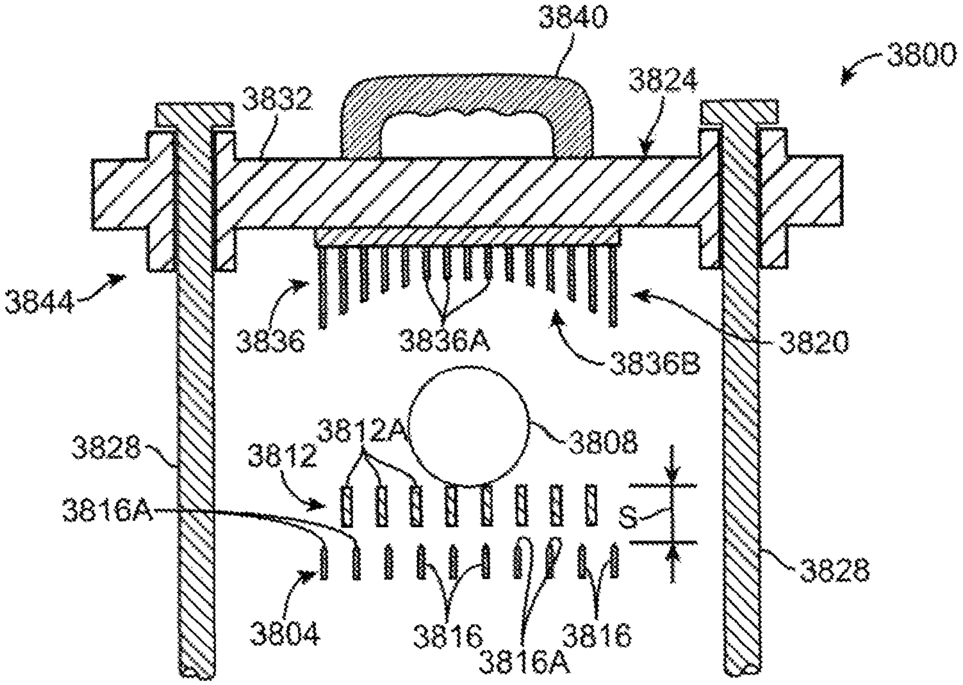
FIG. 39 is a cross-sectional view as taken along line 39-39 of FIG. 38.

As will be understood from reading this entire disclosure, aspects of the present invention are directed to, among other things, food-product slicers having food-product cradles. Such food-product cradles of the present disclosure can provide a variety of advantages, such as reducing the likelihood of operator injury during loading of a slicer, holding a food-product more securely than in conventional slicers, and highly controlled positioning and guiding of a food-product during cutting operations, among others. As will be understood from reading this entire disclosure, a food-product cradle of the present invention can be provided independently of any food-product pusher that may be provided or it can be provided in an integrated into a combined pusher-cradle, with or without additional features, such as a camming region for controllably inducing a slicing action between a food-product and blade set in a food-product slicer otherwise configured for cutting by cleaving action. FIGS. 38 and 39 are used below not only to introduce some general principles of food-product-cradle-outfitted slicers made in accordance with the present invention, but also to show a food-product slicer having a food-product cradle that is independently supported relative to a food-product pusher. FIGS. 1-15, on the other hand, illustrate a food-product slicer that includes a combined pusher-cradle that uniquely imparts the otherwise cleaving-type slicer with slicing action.

Referring now to FIGS. 38 and 39, these figures illustrate a food-product slicer 3800 that includes a blade set 3804 for slicing a food-product, here food-product 3808, into a plurality of slices (not shown) and a food-product cradle 3812 for receiving and holding the food-product prior to any cutting operation. In this embodiment, blade set 3804 lies in a horizontal plane, and food-product cradle 3812 is designed and configured to hold food-product 3808 in spaced relation to the cutting edges 3816A of the blades 3816 in the blade set by a spacing, S (only a few cutting edges 3816A and blades 3816 are labeled for convenience). Spacing S may be any spacing desired to suit a particular design. A benefit of spacing S is that a user's hands (not shown) are kept away from cutting edges 3816A, which reduces the likelihood of the user getting cut by blades 3816. As best seen in FIG. 38, the likelihood of user injury from blades 3816 during product loading is reduced even further by the feature that front end 3812A of food-product cradle 3812 extends so close to the front end 3804A of blade set 3804 that the cradle entirely blocks access to the blade set from the front of food-product slicer 3800, which is the side of the slicer from which food-products, such as food-product 3808, are loaded into the cradle.

As seen in both FIGS. 38 and 39, food-product slicer 3800 is a user-actuated slicer having a food-product pusher arrangement 3820 that thrusts food-product 3808 vertically downward into blade set 3804 during cutting operations. Pusher arrangement 3820 comprises a pusher assembly 3824 slidably engaged with a pair of vertical guide rods 3828. Pusher assembly 3824 includes a support 3832 that slidably engages guide rods 3828 and supports a food-product pusher

3836 designed and configured to push food-product 3808 through blade set 3804 during cutting operations. Pusher assembly 3824 also includes a handle 3840, secured to support 3832, that a user grasps and uses to thrust the pusher assembly downward during cutting operations. Pusher assembly 3824 may be biased toward a home position 3844 via suitable biasing means (not shown) so that after cutting, the pusher assembly returns to the home position, wherein it is ready to receive another food-product for cutting. In the embodiment shown, food-product cradle 3812 is secured to support 3832 so as to be movable therewith. Consequently, when pusher assembly 3824 returns to home position 3844, food-product cradle 3812 blocks blades 3816 to inhibit a user from being cut by the blades.

As seen particularly in FIG. 39, food-product cradle 3812 comprises a plurality of fingers 3812A (only a few labeled for convenience) spaced from one another to provide sufficient support for food-product 3808 but also so that the cradle can extend into blade set 3804 for cutting operations. For similar reasons, pusher 3836 also comprises a plurality of spaced fingers 3836A (only a few of which are labeled for convenience). In this example, fingers 3836A of pusher 3836 defined a contoured region 3836B shaped to maximize the area of contact of the pusher with food-product 3808 to minimize crushing and/or other damage to the food-product during cutting operations. As can be readily appreciated, with the vertical operation of food-product slicer 3800 and the configuration of pusher 3836, the cutting action of this food-product slicer is cleaving action.

Referring again to FIG. 38, in this embodiment food-product cradle 3812 includes at least one food-product stabilizer, here a plurality of nubs 3812B (only a few labeled for convenience), on each of several of fingers 3812A of the cradle. Nubs 3812B inhibit food product 3808 from moving, for example, rolling, on food-product cradle 3812 after placed there by a user. It is noted that while nubs 3812B are shown, other types of food-product stabilizer(s) can be used, such as the food-product piercing spikes 3620 shown in FIGS. 36 and 37. It is also noted that other features disclosed elsewhere in this disclosure, such as housing members 500A and 500B of FIG. 5, can be used in conjunction with any food-product cradle of the present invention, including food-product cradle 3812 of FIGS. 38 and 39.

In addition to the foregoing aspects, features, and functionalities, other aspects of the present disclosure are directed to various additional features and functionalities for food-product slicers. Other aspects of the present disclosure are directed to food-product slicers that include one or more of these features and functionalities. Examples of the features and functionalities disclosed herein include:

- a unique pusher design and actuator arm geometry that allows a slicer to slice both soft and hard food-products by imparting a slicing action without changing its configuration, wherein the pusher is configured to push the food-product(s) first in a direction largely parallel to the longitudinal axes of the blades and then in a direction largely perpendicular to a plane containing tips of the blades, and the actuator arm provides increased leverage relative to conventional mechanical slicers;
- a pusher that is configured to conformally constrain the food-product(s) by applying largely radial forces along an arc subtended by an angle of at least about 60°;
- modular/interchangeable pusher assembly;
- a food-product hopper (e.g., the above cradle in combination with end walls) that further constrains the placement of a food-product for proper slicing and/or allows for loading multiple relatively small food-products;
- a cantilevered blade design for an arc slicer ("arc" for arcuate path of actuator arm) that allows a prep pan to be inserted under slicing region from front and side regions underneath the slicing region;
- a prep pan lock-in-place feature that constrains a prep pan from being disengaged from the slicer when the actuator arm is in its closed position;
- a removable blade cartridge that includes a frame having two levels of blades tensioned therein;
- a blade-cartridge lock for securing the blade cartridge in the slicer and that inhibits use of the slicer without the blade cartridge being in place;
- an integrated blade cartridge wash guard that a user installs on a blade cartridge prior to removing the blade cartridge from the slicer;
- interdigitating blade tensioning members for tensioning slicing blades on each blade level;
- a double-beveled-blade arrangement;
- a beveled-blade cartridge; and
- a cantilevered-blade non-vertical slicer that allows prep pan placement under at least a portion of the cantilevered blades.

For convenience, each of the foregoing features and functionalities is described below in conjunction with a particular slicer, which depending on the case is either a universal slicer 100 (FIGS. 1-15) or a soft-product slicer 1600 (FIGS. 16-31). It is noted that by "universal," it is meant that the slicer is uniquely configured to provide the novel functionality for slicing both soft and hard food-products with superior slicing results. This unique configuration is described below in detail. Conventional soft-product mechanical slicers are typically ineffective for slicing hard food-products because the excessive blade length due to the skewed blades results in the blades flexing too much with hard products. Consequently, the blades would typically become distorted through continual use. Note that in slicers, material is not removed. Rather, the sharp blades either slice (soft products) or cleave (hard products) the product without any loss of material. This can be contrasted to, for example, cutting by sawing where material is lost (e.g., as sawdust) in the process. With hard and largely incompressible products, the lateral forces on the blades become relatively very high because the blades have a non-zero thickness and the actual thickness of the slices is greater than the actual clear distances between adjacent blades. These high forces can cause the long blades to become distorted/damaged relatively quickly. In addition, impacting a hard product on the long and relatively flexible soft-product-slicer blades causes further distortion.

On the other hand, conventional hard-product mechanical slicers are typically ineffective for slicing soft products. When soft food-products are attempted to be cut in a conventional hard-product slicer, the soft product is often at least partially crushed because of the pure cleaving action before the blades start to cut into the product. This is so because the product is thrust into the blades in a direction entirely perpendicular to the blades. This can readily be envisioned with a ripe tomato, which typically squashes significantly between the pusher and the blades before the blades begin to cut into the skin of the tomato.

Before describing each of the foregoing features and functionalities in detail, each of the universal slicer 100 (FIGS. 1-15) and soft-product slicer 1600 (FIGS. 16-27) is described generally to assist with the understanding of the specific features and functionalities.

Figure 1:
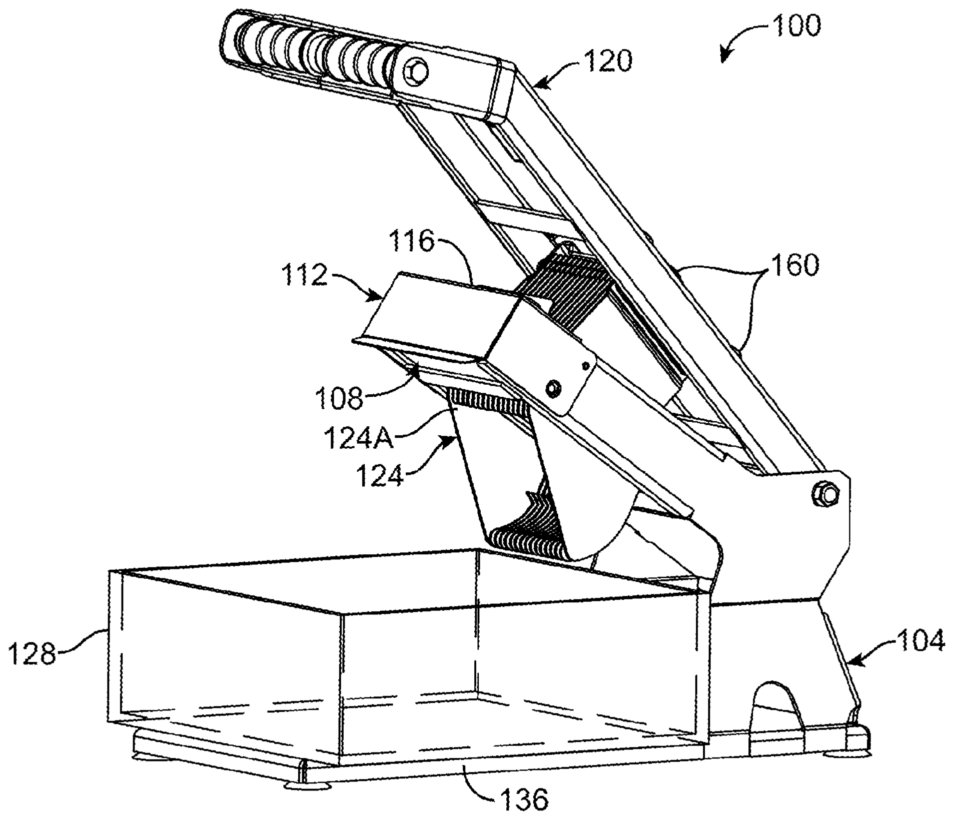
FIG. 1 is an isometric side view of a universal hard- and soft-food-product slicer, showing a prep pan located to received slices of a food-product and showing the actuator arm in a partially closed position.

Referring to FIG. 1, universal slicer 100 includes a base 104, a blade set 108A, here contained in a conveniently removable cartridge 108, a blade-cartridge holder 112, a blade-cartridge lock 116, an actuator arm 120, and a combined pusher-cradle 124. As those skilled in the art will readily appreciate, when combined pusher-cradle is moved (here, by a human user (not shown) via actuator arm 120, but could be by an automated actuator (not shown)) from an open position 400 (FIG. 4) to a closed position 200 (FIG. 2) with a product (such as product 600 of FIG. 6, which can be hard or soft as noted above) in combined pusher-cradle 124, the pusher portion 124A of the combined pusher-cradle moves the product through blades 900 (FIG. 9) within blade set 108A, thereby slicing the product. It is important to note that in the example shown, combined pusher-cradle 124 is the component that is moved relative to blade set 108A during slicing operations. However, those skilled in the art will readily understand that in other embodiments, this need not be so. For example, in some embodiments combined pusher-cradle 124 can be fixed, with blade set 108A being movable relative to the pusher-cradle to effect slicing. Such a movability of blade set 108A can be achieved using a lever-arm arrangement or other type(s) of actuator(s) (not shown). In yet other embodiments, both of combined pusher-cradle 124 and blade set 108A can be movable relative to base 104 in directions toward and away from one another to effect slicing. Such movements can be imparted, for example, using any of a variety of mechanical linkages alone and/or one or more automated actuators.

In this connection, it is noted that the terms "pusher," "pusher head," pusher assembly," and like terms as used herein and the appended claims cover not only structures that move food-product toward a blade set at issue, such as blade set 108A of FIG. 1, but also like structures against which food-product is pushed by moving a set of blades into the food-product, such as in an arrangement similar to the arrangement of FIG. 1, but wherein combined pusher-cradle 124 is fixed and blade set 108A is movable as mentioned above. In such embodiments, the "pushing" is a resistive pushing, or pushing back, against the forces created by moving the blade set into the food-product. As seen in FIG. 1, by virtue of the cantilevered design in which blade set 108A is cantilevered from base 104, a prep pan 128 placed below blade cartridge 108 catches the product slices (not shown).

It is further noted that while a combined pusher-cradle 124 is shown in the drawings with an integrated pusher portion 124A, this need not be so. Using pusher-cradle 124 as an example, pusher portion 124A can be replaced by a separate pusher (not shown) that is not monolithic with the cradle. Such a separate pusher can be independently supported relative to the cradle, such as each being mounted independently to actuator arm 120, while retaining the geometry appropriate to each. In this connection, it is noted that the break point between a separate pusher and a separate cradle can be anywhere desired, including the beginning, end, or intermediate location of any camming region provided as described elsewhere herein.

Figure 14:
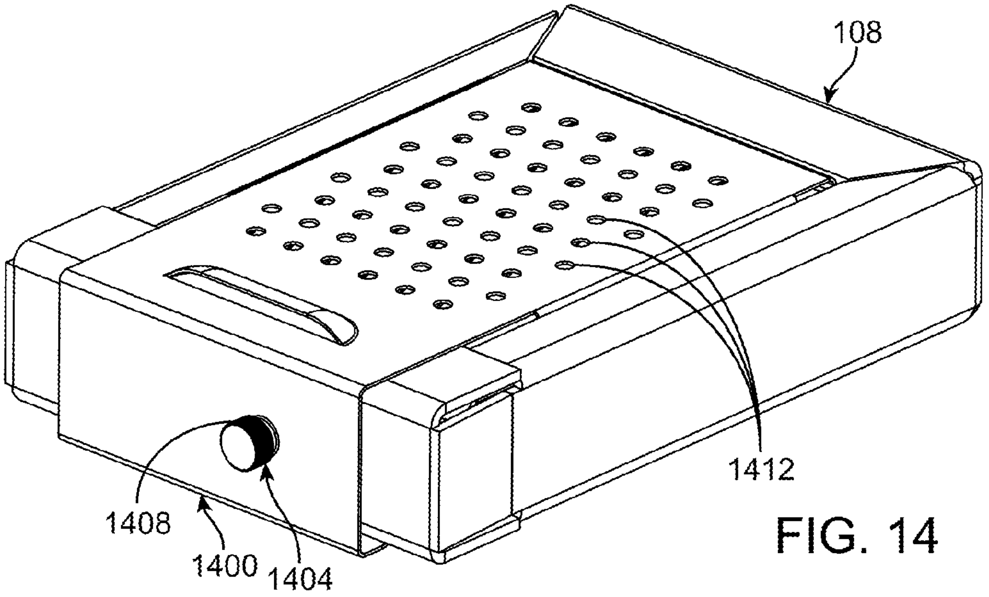
FIG. 14 is an isometric side view of the blade cartridge of FIGS. 11 and 12 engaged by an integrated wash guard.
Figure 15:
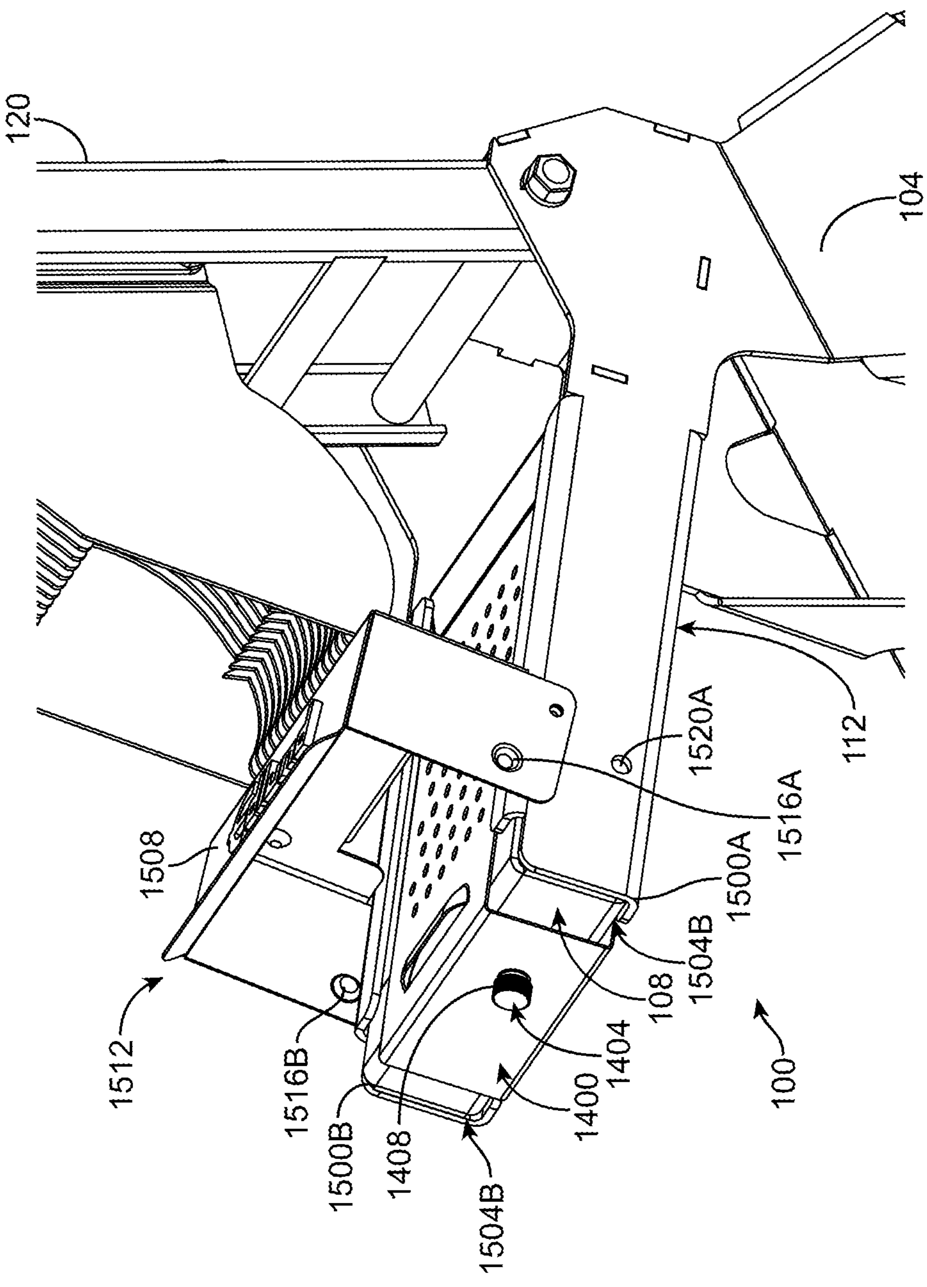
FIG. 15 is an enlarged isometric side view of a universal slicer of the present disclosure, illustrating the insertion of a wash-guard-protected blade cartridge into the slicer.
Figure 16:
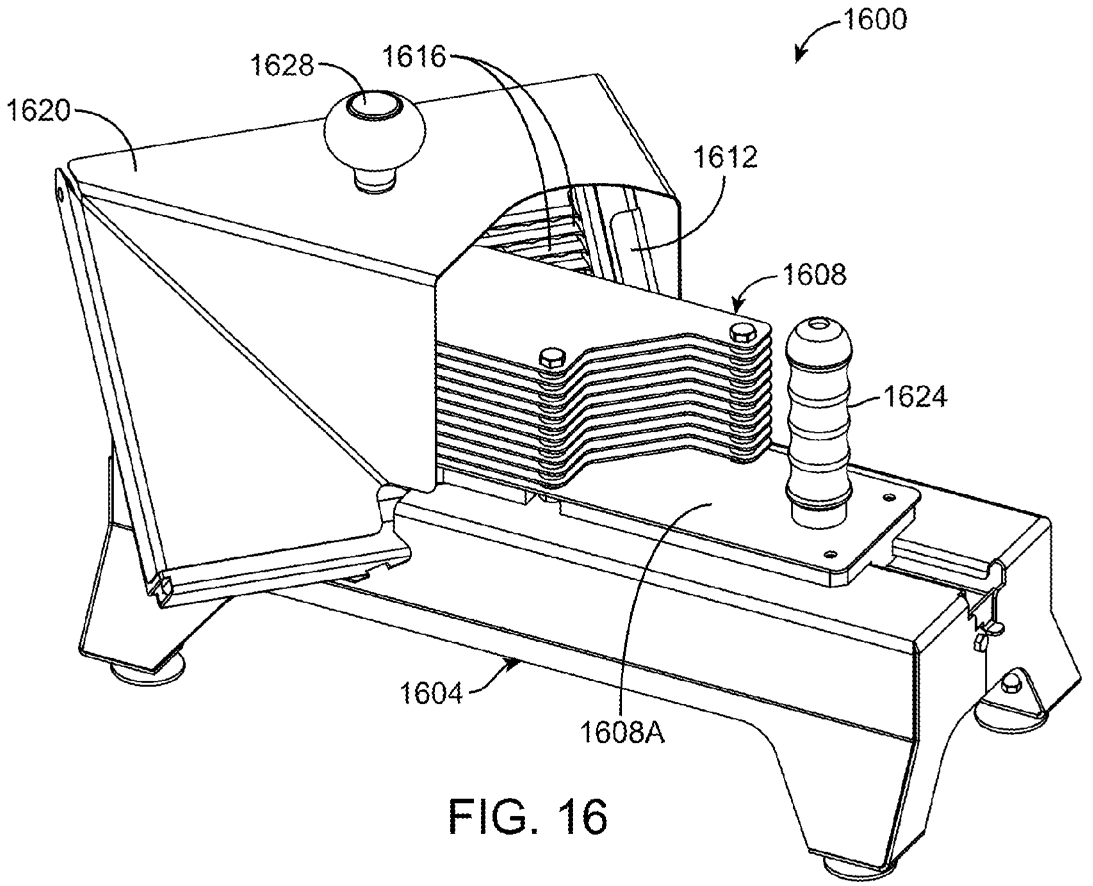
FIG. 16 is an isometric top/side view of a soft-product slicer made in accordance with aspects of the present disclosure.
Figure 21:
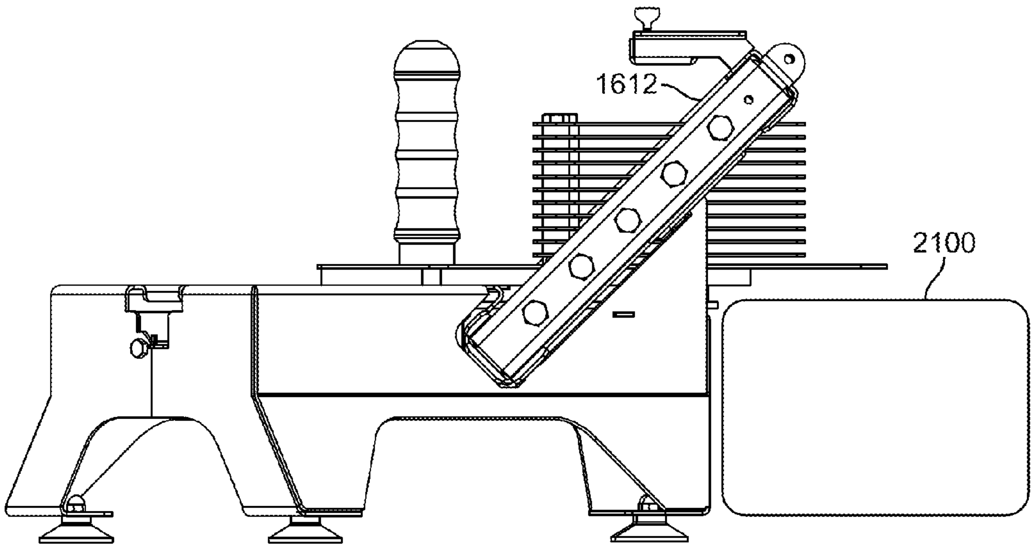
FIG. 21 is an isometric end/side view of the slicer of FIG. 16, showing the position of a prep pan for catching slices of the food-product after slicing.

Turning to FIG. 16, soft-product slicer 1600 includes a base 1604, a pusher assembly 1608, a blade set 1612A, here contained in a conveniently removable blade cartridge 1612, that includes a plurality of blades 1616, a blade-cartridge lock 1620, and first and second handles 1624 and 1628. As those skilled in the art will readily appreciate, when pusher assembly 1608 is moved (here by a human user (not shown) using first and second handles 1624, 1628, but could be by an automated actuator (not shown)) from a product loading position 1700 (FIG. 17) to a sliced position 1800 (FIG. 18) with a soft product (not shown, such as a ripe tomato) in the pusher, the pusher moves the product through blades 1616, thereby slicing the product. As seen in FIG. 21, a prep pan 2100 placed below/adjacent to blade cartridge 1612 is positioned to catch the product slices (not shown). As with universal-product slicer 100 of FIGS. 1-15, those skilled in the art will readily appreciate that pusher-assembly 1608 (FIG. 16) need not be the movable component or the only moving component that effects slicing. For example, relative to the embodiment illustrated, pusher-assembly 1608 can be fixed relative to base 1604, with a movable version (not shown) of blade set 1612A effecting the slicing. As another example, relative to the embodiment illustrated both pusher-assembly 1608 and blade set 1612A can be movable toward one another during slicing. Those skilled in the art will readily understand how to implement these alternatives in the embodiment shown, as well as other embodiments.

Figure 6:
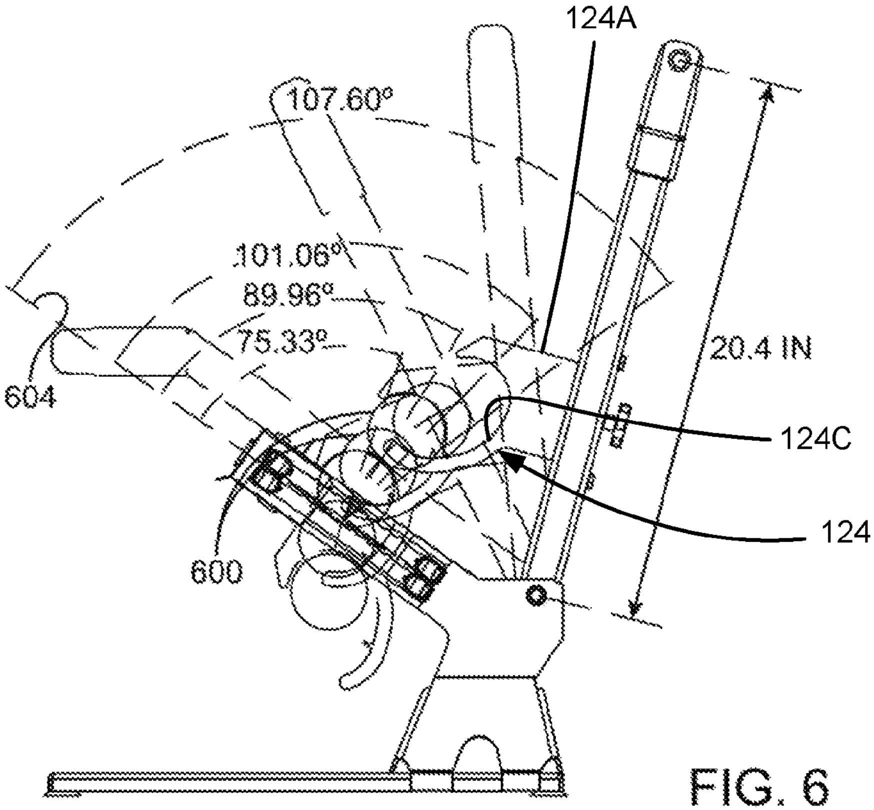
FIG. 6 is a side view/motion diagram of a universal slicer of the present disclosure, illustrating the movement of the product during pushing of the product through the blades.
Figure 9:
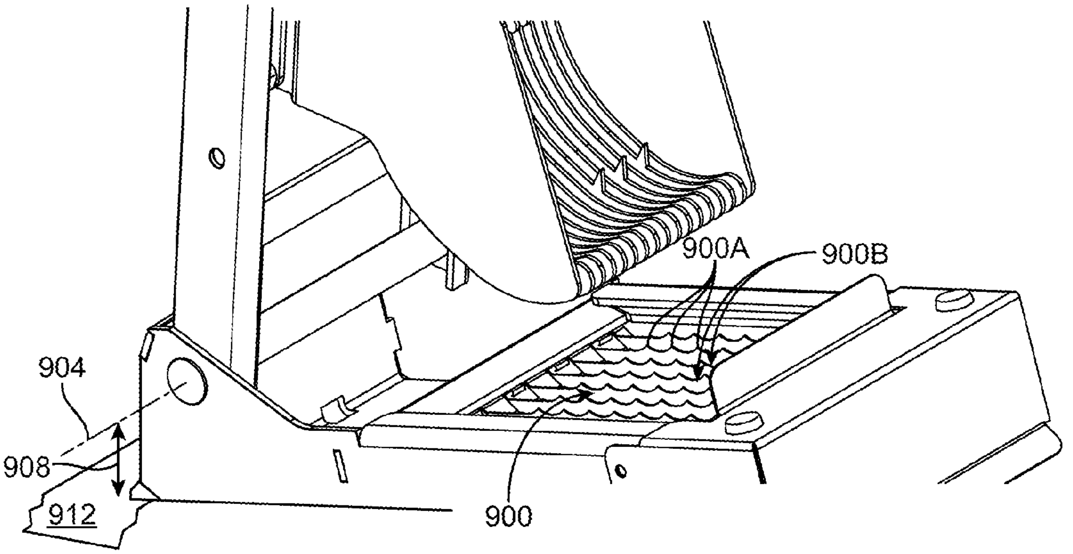
FIG. 9 is an enlarged isometric side view of a combined product hopper and pusher of a universal slicer of the present disclosure.

Pusher Design/Pusher-Arm Geometry for Universal Soft- and Hard-Food-Product Slicing In contrast to conventional mechanical slicers, the pusher design and pusher-arm geometry of the present disclosure, or camming arrangement, have unique properties that allow a slicer to cut both soft and hard food-products. These features include: 1) a specially shaped pusher (see, e.g., pusher portion 124A of combined pusher-cradle 124 of FIG. 1); 2) an actuator arm (see, e.g., actuator arm 120 of FIG. 1) having a pivot axis offset above a plane containing the cutting edges of the blades of the (upper) blade assembly; and 3) an actuator arm (again, see actuator arm 120 of FIG. 1) having increased leverage relative to conventional mechanical slicer. An example of the pivot axis offset is illustrated in FIG. 9, wherein pivot axis 904 is offset by a distance 908 from a plane 912 containing the tips 900A of the cutting edges 900B of blades 900. An example of how the increased leverage is achieved is shown in FIG. 6, wherein the lever arm of actuator arm 120 is about 20 inches and the radial distance from the pivot point to the center of pusher portion 124A is about 7 inches for about a 3:1 mechanical advantage. As described below, these features work together to provide an arc slicer with the ability to handle soft food-products by inducing a slicing motion that inhibits the crushing behavior typically seen in conventional hard-product slicers (which have pure cleaving action), while at the same time providing the slicer with relatively short, robust blades that can stand up to the rigors of hard-product cutting.

FIG. 6 is a motion diagram of exemplary universal arc slicer 100 showing how the angle of the thrust axis of product 600 relative to a plane 604 parallel to the blades (the "blade plane") changes as pusher portion 124A of combined pusher-cradle 124 moves the product into blades 900. As seen in FIG. 6, when product 600 initially contacts blades 900 (FIG. 9) in this particular example, the thrust axis is at about 107° relative to the blade plane 604. Then, as product 600 is pushed further, the thrust axis gradually changes until it is at about 75° relative to blade plane 604, where the product is nearly or fully cut. It is emphasized that the angles shown are merely exemplary and that in other embodiments that angles and trajectory of the product being cut (here, product 600) can be different from this illustration. In this connection, an important feature of pusher portion 124A is how its specially shaped contour in camming region 124C causes the angle of the thrust axis of product 600 to be other than 90° and to change during the cutting process. It is this unique contour that causes combined pusher-cradle 124 to induce a cammed slicing-cleaving action into food-product 600. In the example shown, the contour of camming region 124C is generally elliptical.

Another important aspect of pusher portion 124A is the manner in which it extends behind (from the vantage point of a user facing slicer 100 and looking down actuator arm 120 from the handle end) product 600 being sliced, even at the point that the product is just resting on blades 900 (FIG. 9), e.g., when cradle 404 (FIG. 4) moves just below the tips of the blades. From this point wherein product 600 first contacts blades 900 (FIG. 9), any further closing of actuator arm 120 causes pusher portion 124A to move product 600 in a direction largely parallel to plane 604 (FIG. 6). As an analogy, the interaction between pusher portion 124A and product 600 as a user closes actuator arm 120 from the time that the product is engaged with the blades can be likened to the interaction between a cam and follower. For this reason, a pusher portion or pusher of this type, and as disclosed herein, can be referred to as a "cammed pusher portion" or a "cammed pusher," respectively, and the action created by such interaction can be referred to as a "camming action." As those skilled in the art will readily appreciate, even further continued closing of actuator arm 120 causes cammed pusher portion 124A to continue to push product 600, not only with a force component parallel to plane 604, but eventually with an increasing component perpendicular to plane 604 as the continued motion brings contact between the haunches of the pusher portion as the arcuate (here elliptical) pushing face of the pusher portion is moved by continued closing of the actuator arm.

Those skilled in the art will readily appreciate a number of facts about a pusher or pusher portion made in accordance with the present disclosure. First, the shape of the pushing face of the pusher/pushing portion need not be precisely as shown. For example, if an elliptical curvature is used, the arc may be deeper or shallower than shown. In addition, curved shapes other than elliptical can be used, as can linear segments. Furthermore, it is noted that cammed pusher portion 124A shown is sized for 3.5-inch diameter product, which in this case corresponds to the diameter of a typical tomato. In other embodiments, the cammed pusher/pusher portion can be of another size suited for a particular product or set of products. In still other embodiments, curvature can be imparted into the cam face of cammed pusher/pusher portion in a direction perpendicular to the elliptical shape shown. In such a case, the cammed pusher portion or pusher could be designed to conformally receive a generally spherical product, such as a tomato or apple. Moreover, it should be understood that the unique cammed pusher configuration described in this section and the next section can be implemented independently of one another, as well as independently of cradle 404 (FIG. 4, and described below), including independently of hopper 504 (FIG. 5).

Figure 7:
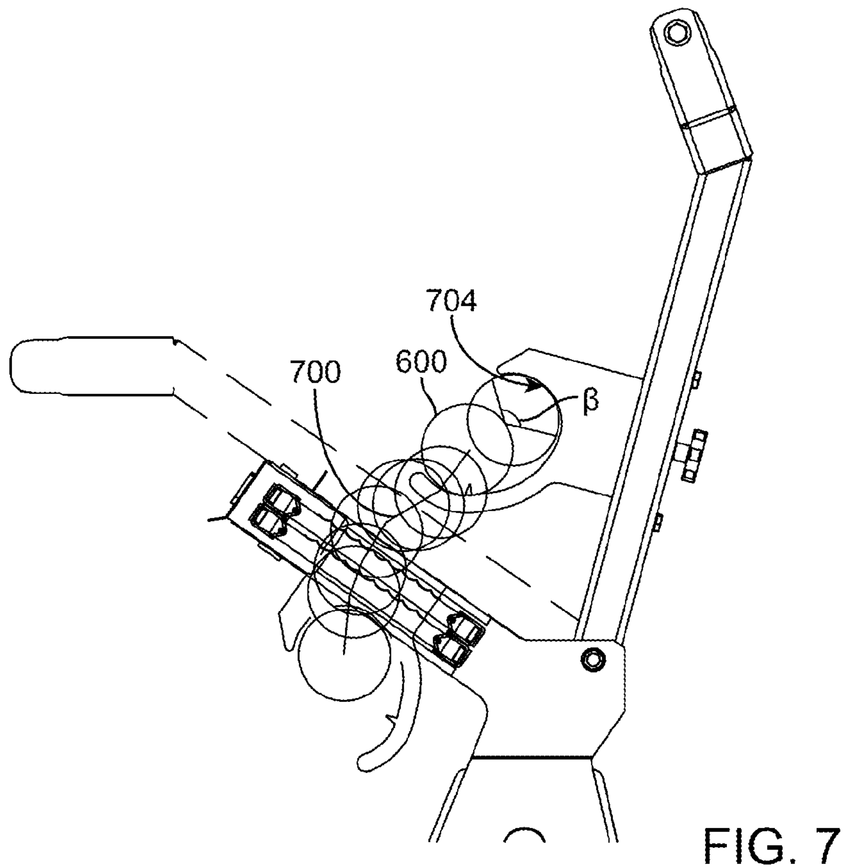
FIG. 7 is an enlarged side view/movement diagram illustrating the movement of the product during pushing of the product through the blades.

FIG. 7 highlights the trajectory 700 of the center point of product 600 as the product is pushed through blades 900. This trajectory 700 and changing thrust-axis angle (FIG. 6), along with the unique shape of camming region 124C of pusher portion 124A and pivot axis 904 of actuator arm 120 being above blade plane 604, effectively induces a slicing action (as opposed to pure cleaving action) between blades 900 and product 600. This slicing action inhibits crushing of soft products, such as ripe tomatoes, which are notoriously challenging to slice. At the same time, blades 900 are short (relative to conventional soft-product slicers), and therefore sturdy, allowing slicer 100 to handle hard products as well.

To envision the benefit of this slicing effect, one can readily contemplate attempting to cut a ripe tomato by placing it on a cutting board, orienting the cutting edge of a knife blade parallel to the cutting board, and moving the blade directly downward toward the cutting board in a cleaving-technique style. Because the skin (exocarp) of the tomato is relatively tough compared to the soft meso- and endocarp inside the skin, attempting to cut the tomato in this manner results in significant crushing of the tomato before the skin is penetrated. However, when using a slicing technique in which the cutting edge is drawn across the skin while applying slight downward pressure, as long as the blade is sharp the blade slices the skin with virtually no crushing distortion.

Conformally Constraining Pusher

As described above, cammed pusher portion 124A is specially shaped to impart motion, referred to herein as "camming motion," having changing vector components in directions both parallel and perpendicular to plane 604 (FIG. 6). This motion tends to aid the slicing process by inducing a traditional slicing action (akin to a knife being drawn along a surface to be cut) and/or by causing tips 904 (FIG. 9) of blades 900 to causing initial piercings of product 600, depending on the exact configuration of cammed pusher portion 124A. In the cammed-pusher-portion embodiment shown in FIG. 6, the camming motion is imparted into product 600 by virtue of the shape of pusher portion 124A. However, in other embodiments, some of which are illustrated elsewhere in this application, a mechanical cam-follower arrangement can be used, for example, on the pusher/pusher portion and/or on the blade set to achieve the same slicing and cleaving action as specially shaped cammed pusher portion 124A.

Referring again to pusher portion 124A illustrated, as an additional feature the "upper" (relative to the generally vertical configuration of the exemplary slicer 100 shown) part of cammed pusher portion 124A, i.e., the part of the pusher portion that engages the upper (relative to the generally vertical exemplary slicer 100) part of a product (such as product 600 of FIG. 6) during later stages of slicing, can be configured to fairly well conform to the shape of the upper part of the product so as to maximize the contact area between the pusher portion and a largely un-deformed product. As can be envisioned from FIG. 7, when product 600 is engaged in the upper part 704 of pusher portion and the product is slightly deformed (although not shown in FIG. 7, by being compressed between upper part 704 and blades 900 when actuator arm 120 is closed more), the upper part contacts the product along an arc subtended by an angle β of about 150°. This spreads the compressing force out over a relatively large area of product 600, thereby increasing the likelihood of successful slicing. In this connection, it can be envisioned that if arched upper part 704 were replaced by a much more non-conformal pushing face, a ripe tomato would be far more prone to crushing and rupturing than the same tomato that is conformally engaged by upper part 704 shown.

As with other parts of cammed pusher portion 124A, conformal upper part 704 can be configured to suit a particular product, size of product, set of products, etc. In general, it can be desirable for upper part 704 to be configured so that it conformally engages product 600 along an arc subtended by an angle of at least about 60°, more desirably 100° or more. It is noted that upper part 704 of cammed pusher portion 124A can be configured to be contoured three dimensionally, for example, by adding curvature in a direction perpendicular to the arc illustrated in FIGS. 6 and 7. For example, if cammed pusher portion 124A is designed for tomatoes, onions, and apples, the contour on conformally engaging upper part 704 can be spherical. Of course, contours of other shapes may be desirable for other products. It is noted that, at least in part, the conformal shape of upper part 704 allows slicer 100 to have a relatively large mechanical advantage, such as the 3:1 mechanical advantage noted above. This is so because the conformal nature of upper part 704 distributes the force imparted by cammed pusher portion 124A over such a large area of product 600 that crushing and/or rupturing (e.g., of a ripe tomato) of the product is not likely to occur.

Modular/Interchangeable Pusher Assembly

Figure 30:
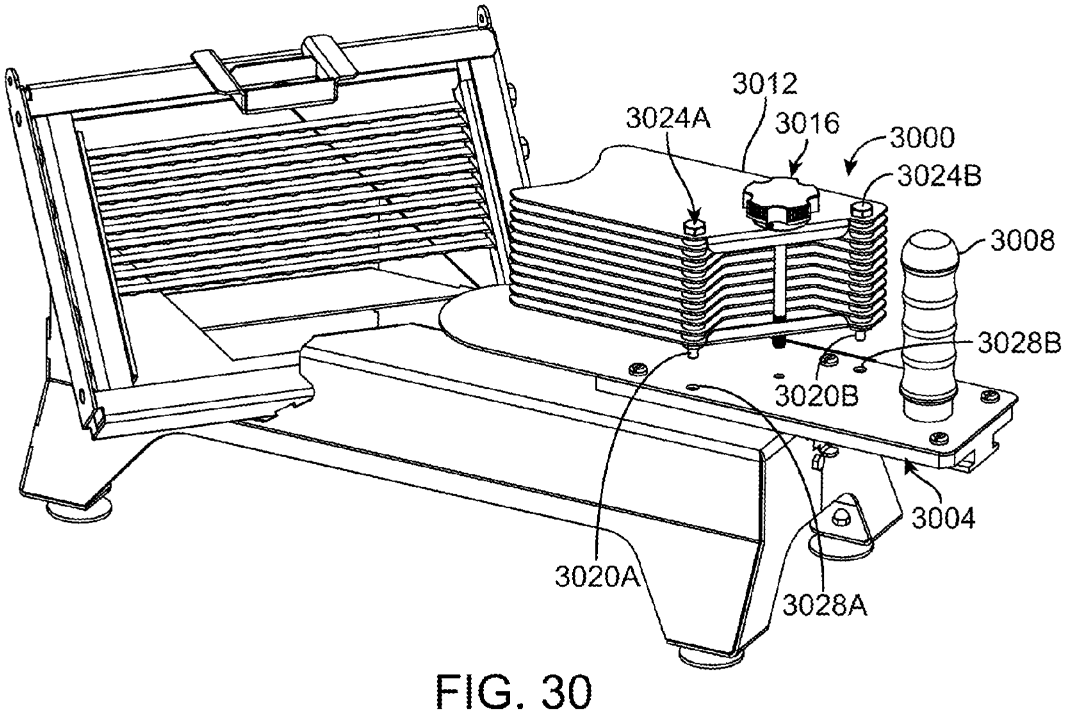
FIG. 30 is a perspective view of a modular pusher assembly that can be used with a slicer such as the slicer of FIG. 16, showing the pusher head disengaged from the sliding base.
Figure 31:
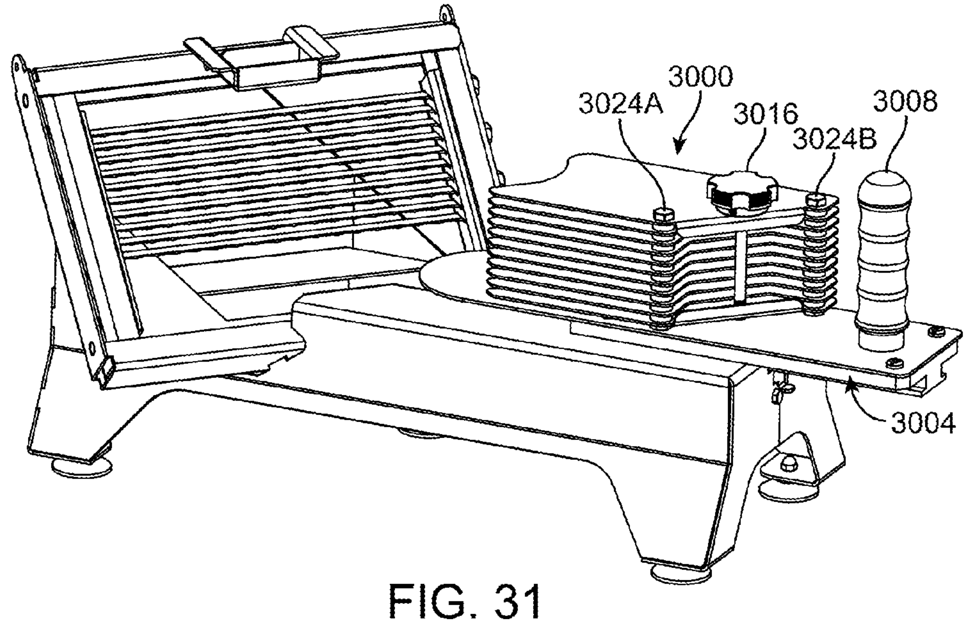
FIG. 31 is a perspective view of the modular pusher assembly of FIG. 30, showing the pusher head engaged with the sliding base.

A slicer of the present disclosure, such as slicer 100 of FIG. 1 and slicer 1600 of FIG. 16, can be provided with a modular pusher assembly that readily allows a user to remove and install the combined pusher-cradle or pusher, respectively, without having to remove other parts of the slicer, such as actuator arm 120 (FIG. 1) or the sliding base 1608A of pusher assembly 1608 (FIG. 16). Taking slicer 100 of FIG. 1 as an example for such modularity, combined pusher-cradle 124 can be made readily removable, for example, by replacing fasteners 160 with one or more quick-connect devices. Taking slicer 1600 of FIG. 16 as an example, for modularity, a modular pusher assembly 3000 that can take the place of pusher assembly 1608 of FIG. 16 is shown in FIGS. 30 and 31. As seen in FIGS. 30 and 31, modular pusher assembly 3000 includes a sliding base 3004, a handle 3008, a readily removable pusher head 3012, and a quick-connect mechanism 3016, which, in this example, works in conjunction with ends 3020A and 3020B of bolts 3024A and 3024B that act as anti-pivot pins that are received in corresponding respective apertures 3028A and 3028B in the sliding base when the pusher head is properly engaged with the sliding base. In this example, quick-connect device 3016 is a screw-type device. However, in other embodiments, the pusher head can be engaged with the sliding base using one or more of any other suitable quick-connect device, such as latches, clamps, locking pins, spring clips, etc., and any combination thereof.

Generally, a quick-connect connection between the pusher head and the sliding base is a connection that allows a user to fasten and unfasten the pusher head relative to the sliding base without the need for an externally provided tools. It is noted that while pusher head 3012 of FIG. 30 is shown as being made out of metal, those skilled in the art will readily appreciate that it can be made of one or more other materials, such as plastic. Indeed, a quick-connect-type pusher head can be injection molded solely of plastic and include integrally formed spring-type latches that engage corresponding respective slots in the sliding base, among many other alternatives that will become apparent to those skilled in the art after reading this disclosure.

As alluded to in the two immediately previous sections, pushers/pusher portions of slicers made in accordance with the present disclosure are typically configured to handle one or more particular products and even a certain range of size of a particular product. In this connection, some embodiments can be outfitted with a modular pusher that allows part of the pusher assembly to be readily replaceable. For example, multiple pusher heads (see, e.g., pusher head 3012 of FIG. 30) or multiple combined pusher-cradles (see, e.g., combined pusher-cradle 124 of FIG. 1) configured for differing food-products can be made. In this manner, a user can select the particular pusher head or combined pusher-cradle from a set of such devices that is most suited to the food-product that the user is going to slice. If that pusher head or combined pusher-cradle is not already on the slicer, using a quick-connect connection, the user can easily remove the currently installed pusher head or combined pusher-cradle and install the selected one in its place.

Food-Product Cradle

Figure 4:
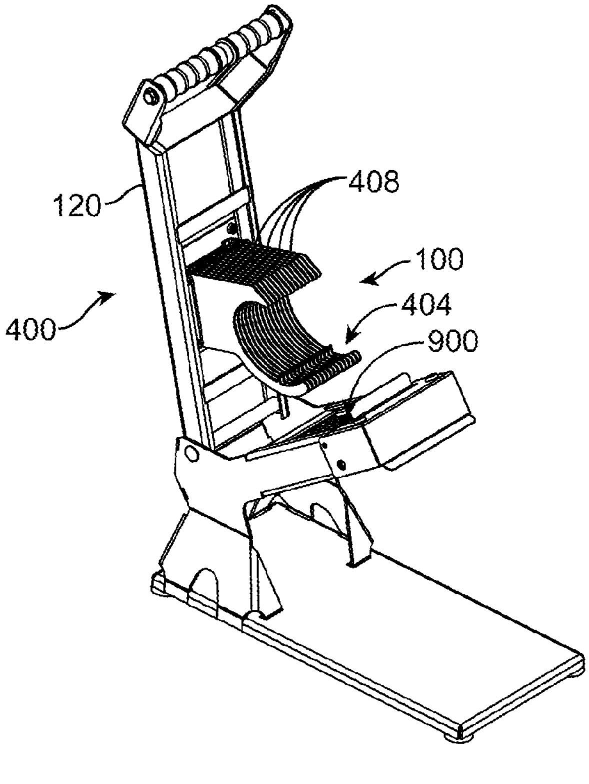
FIG. 4 is an isometric side view of a universal slicer similar to the slicer of FIG. 1 but without the cradle end walls that turn the product cradle into a hopper.
Figure 5:
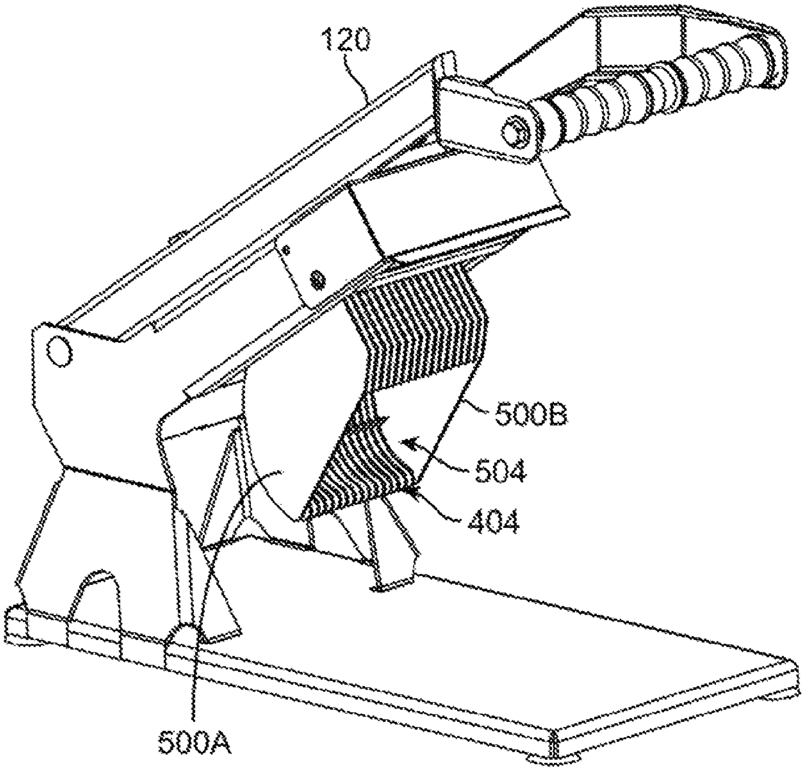
FIG. 5 is an isometric side view that is the same as the view of FIG. 3 but without the prep pan.

As readily seen in FIG. 4, slicer 100 used to illustrate various features and functionalities of the present disclosure includes a product cradle 404, which in this example is an integral part of combined pusher-cradle 124, along with pusher portion 124A. An aspect of cradle 404 is that it allows a user to insert product(s) into slicer 100 while keeping the user's hands away from blades 900. In the typical conventional vertical slicer, the user places the product directly onto the blades. Consequently, under the best conditions the user's hands get very close to the blades. In addition, if the product(s) shift(s) around to an undesirable orientation after initial placement onto the blades, the user may reach in to reorient the product(s) and in doing so may contact the cutting edge of one or more of the blades. In contrast, with cradle 404, the user's hands are always positioned at a safe distance from blades 900, even when orienting the product (s) to the desired orientation, if that is even necessary. As will be readily understood by those skilled in the art, cradle 404 is composed of a plurality of members, or fingers, 408 spaced from one another to accommodate passage of the cradle through blades 900.

Figure 8:
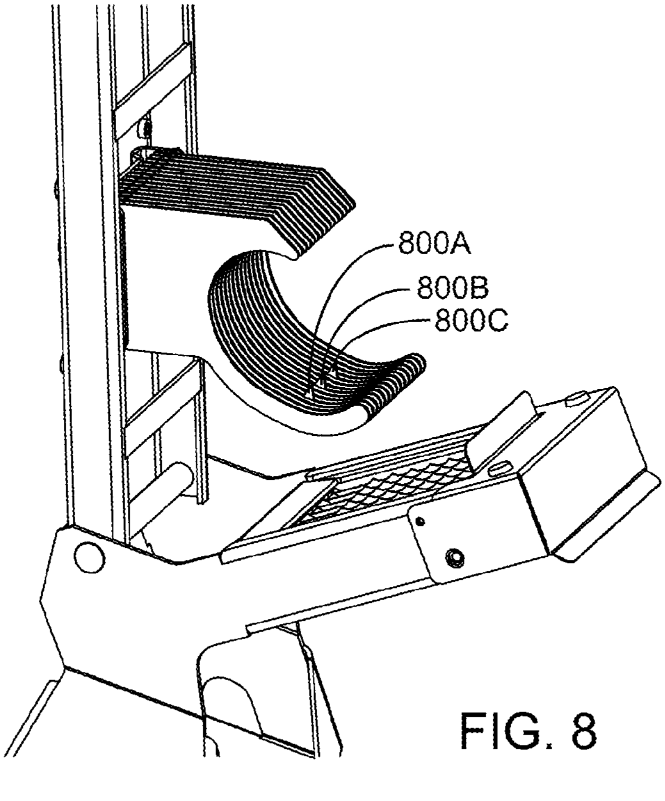
FIG. 8 is an enlarged view of a combined product cradle and pusher of a universal slicer of the present disclosure.

Still referring to FIG. 4, and also to FIG. 8, in the embodiment shown cradle 404 includes several product retainers, here three spikes 800A to 800C (FIG. 8) that pierce the product (not shown) and tend to hold the product in place. Those skilled in the art will readily appreciate that the number, spacing, and orientation of spikes provided can be different from that illustrated and that spikes 800A to 800C can be replaced or complemented by one or more other retainers, such as a plurality of nubs on each of a plurality of the spaced fingers 408, among others, to suit a particular product or set of products to be sliced.

Food-Product Hopper

In some embodiments, the cradle can be augmented with side housing members to laterally constrain the product(s) in the cradle. For example, as seen in FIG. 5, cradle 404 is flanked by side housing members 500A and 500B, effectively forming a food-product hopper 504. As those skilled in the art can readily envision, when actuator arm 120 is in an open position, for example, open position 400 of FIG. 4 (though FIG. 4 does not show side housing members 500A and 500B), the side housing members laterally constrain any product(s) within hopper 504 so that the product(s) are always in the cutting zone. In other words, side housing members 500A and 500B prevent the product(s) in hopper 504 from laterally overhanging cradle 404, where they may contact the lateral sides of blade cartridge 108 outside of the cutting zone, where they will interfere with proper cutting and perhaps cause other undesirable consequences. Another benefit of side housing members 500A and 500B is that a user can readily load hopper 504 with multiple relatively small products without having to worry about some of the products from falling from the lateral ends of cradle 404, where they may land either on blades 900, causing danger to the user for removal, or in prep pan 128 (FIG. 1) in an unsliced form.

Cantilevered Blade Design for Arc Slicer

Figure 2:
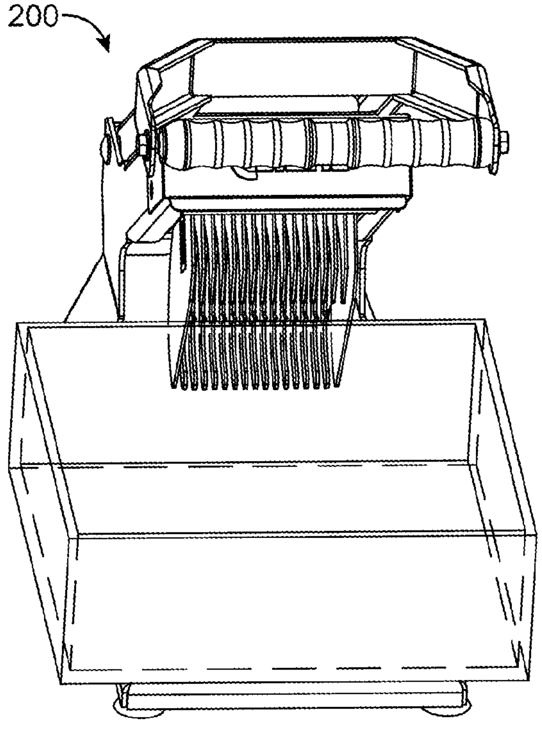
FIG. 2 is an isometric front view of the slicer of FIG. 1, again showing the prep pan in a slice-receiving position and showing the actuator arm in a fully closed position.

Various embodiments of arc slicers, such as slicer 100 of FIG. 1, can be configured to have a cantilevered blade design in which the cutting blades are cantilevered from one side or another (including "front" and "back") to allow for virtually unobstructed placement of a prep pan underneath the blades for catching product slices as they fall from the blades. Referring to FIG. 1, the cantilevered blade design is executed by providing base 104 of slicer 100 with a platform 136 that extends toward the front (portion closest to a user) of the slicer and cantilevering blade cartridge 108 from the base. As can be readily seen in FIG. 1, this cantilevered design allows a user to easily place prep pan 128 beneath blade cartridge 108 from the front, either side, or something in between the front and either of the sides. In addition, during slicing operations, the user can easily shift and/or rotate prep pan 128, especially for relatively large prep pans, as needed to maximize the amount of slices collected in that pan. In this example, prep pan 128 rests on platform 136, but in other embodiments, this need not be so. For example, if slicer 100 were modified to not include platform 136 and be rigidly fastened, for example, to a countertop (not shown), prep pan 128 could rest directly on the countertop. In other freestanding embodiments, platform 136 could be replaced, for example, with two elongate members (not shown) that extend toward the user and provide the same structural function of keeping slicer 100 from pivoting toward the user as the user moves actuator arm 120 from open position 400 (FIG. 4) to closed position 200 (FIG. 2). It is noted that while slicer 100 includes a cantilevered blade cartridge 108, in other embodiments the blades (e.g., blades that may be similar to blades 900 of FIG. 9) need not be in a cartridge.

Lock-In-Place Functionality for Prep Pan

Figure 3:
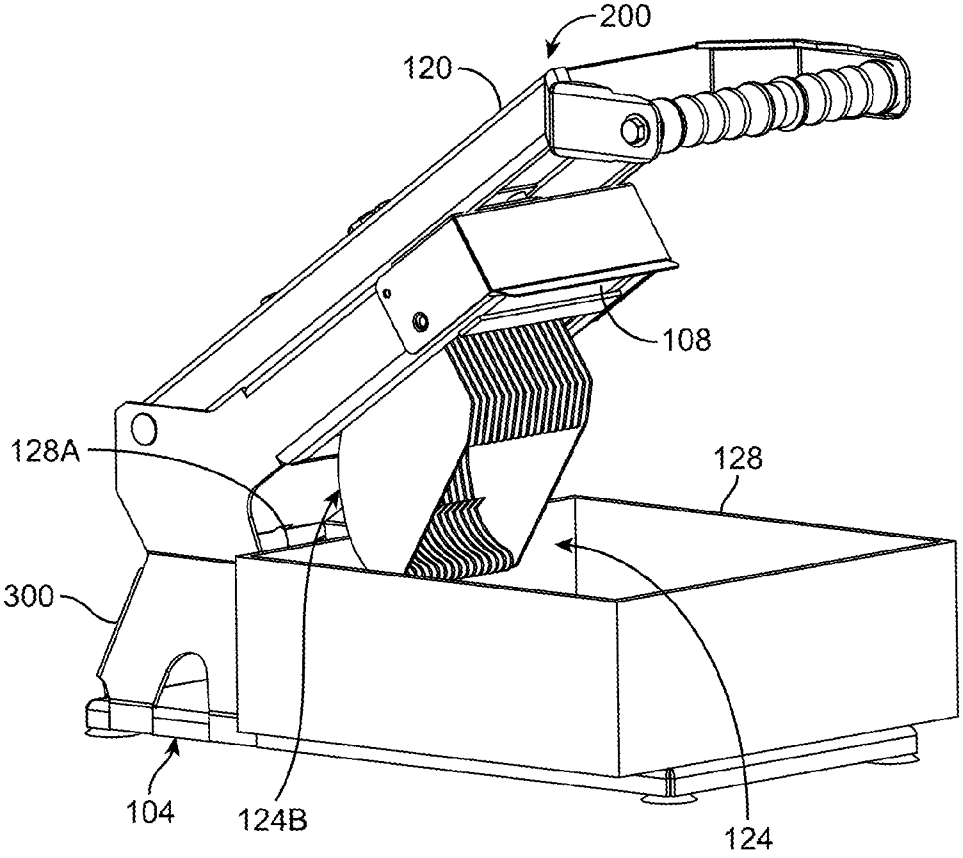
FIG. 3 is an isometric side view of the slicer of FIG. 1, yet again showing the prep pan in the slice-receiving position and showing the actuator arm in a fully closed position so as to effectively lock the prep pan into place.

A cantilevered blade design can lead to a prep pan being bumped and accidentally displaced from its desired position because of the way it can protrude away from the slicer, especially for relatively large prep pans. To counter this, a slicer can be provided with a lock-in-place functionality. For example and referring to FIG. 3, the lock-in-place functionality is provided by the configuration of a riser portion 300 of base 104 at the back of prep pan 128, and the relationship between the riser portion and combined pusher-cradle 124 when actuator arm 120 is in closed position 200. As seen in FIG. 3, when actuator arm 120 in is closed position 200, the back wall 128A of prep pan 128 is sandwiched between riser portion 300 of base 104 and the backside 124B of combined pusher-cradle 124, effectively locking the pan into place. As those skilled in the art will readily appreciate, when a user is not slicing and is keeping prep pan 128 at the ready beneath blade cartridge 108, the user can move actuator arm 120 to its closed position 200 to essentially lock the prep pan in place during period of nonuse, thereby minimizing the likelihood of someone knocking the prep pan out of place, perhaps causing it to fall to the floor.

Blade-Cartridge Lock

Figure 10:
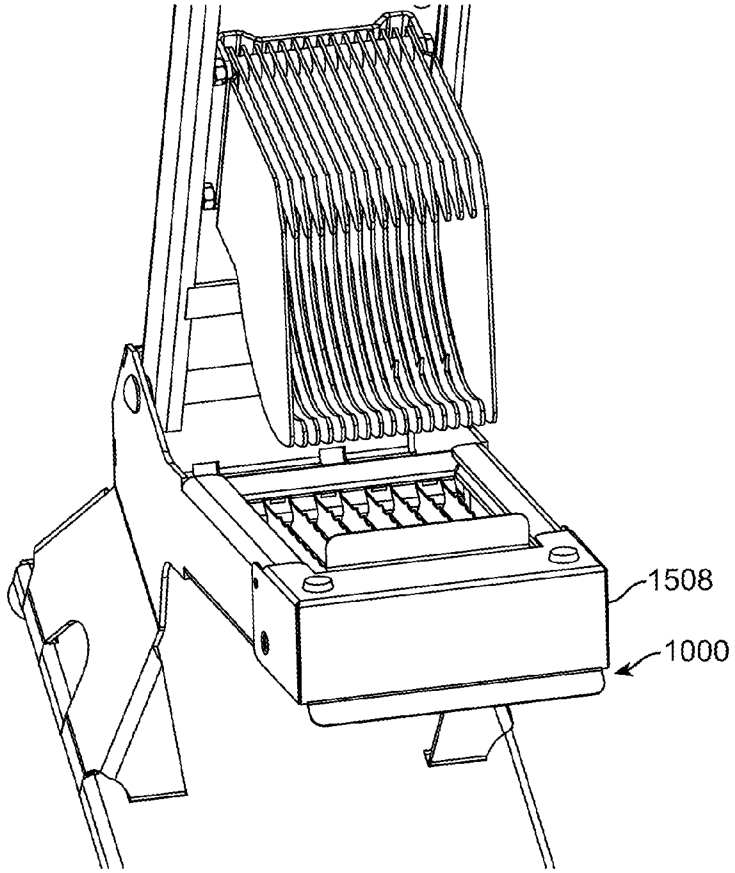
FIG. 10 is an isometric front view of the combined product hopper and pusher of FIG. 9.

A cartridge-based slicer can be provided with a pivoting cartridge lock for locking and holding the blade cartridge into place. For example, in the context of slicer 100 of FIGS. 1-15 and referring to FIG. 15, as mentioned above the slicer includes a cartridge holder 112 that cantilevers from base 104. In this example, cartridge holder 112 includes lateral side members 1500A and 1500B having channels 1504A and 1504B, respectively, that slidably receive corresponding respective sides of blade cartridge 108. A cartridge lock 1508 is pivotably attached to lateral side members 1500A and 1500B so as to be pivotable between an unlocked position 1512 and a locked position 1000 (FIG. 10). In the example shown, cartridge lock 1508 pivots upward for unlocking. However, in other embodiments the cartridge lock can pivot in other directions, such as downward or laterally, among others. In yet other embodiments, the cartridge lock can be removable. In the example shown, cartridge lock 1508 includes a pair of detent features 1516A and 1516B that engage a corresponding respective pair of detent features 1520A and 1520B on cartridge holder 112 (only feature 1520A is visible in FIG. 15) to inhibit the cartridge lock from being unintentionally moved out of locked position 1000. Those skilled in the art will readily understand that other movement inhibiting means, such as latches, pins, spring clips, etc., can be used in place of or in addition to detent features 1516A, 1516B, 1520A, and 1520B. When closed, for example as shown in FIG. 10, cartridge lock 1508 prevents blade cartridge 108 from sliding along lateral side members 1500A and 1500B (FIG. 15) during use of slicer 100. As can be readily appreciated, during sliding operations, as a user closes actuator arm 108 with a product in combined pusher-cradle 124, that action causes the product to push blade cartridge 108 against cartridge lock 1508, but the cartridge lock prevents the blade cartridge from becoming disengaged from cartridge holder 112. Another benefit of cartridge lock 1508 is that when it is in its open position as shown in FIG. 15, slicer 100 cannot be used. This is so because actuator arm 120 will strike cartridge lock 1508, thereby being blocked from fully closing.

Figure 17:
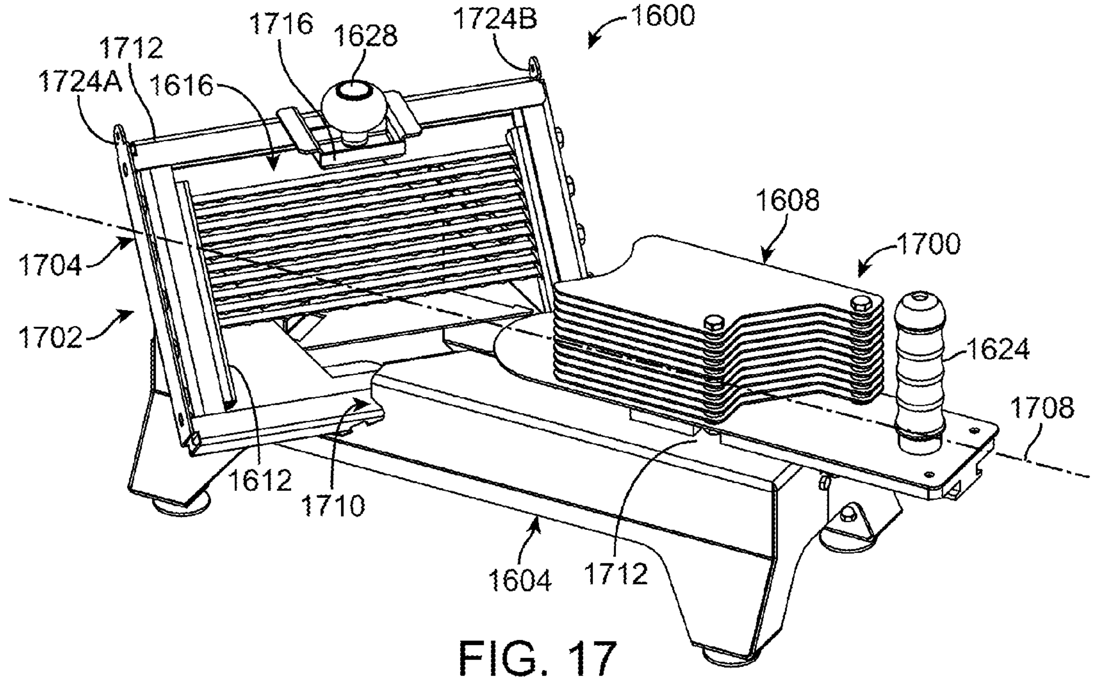
FIG. 17 is an isometric top/side view of the slicer of FIG. 16, showing the safety shield removed to reveal the double-bevel blade cartridge.
Figure 18:
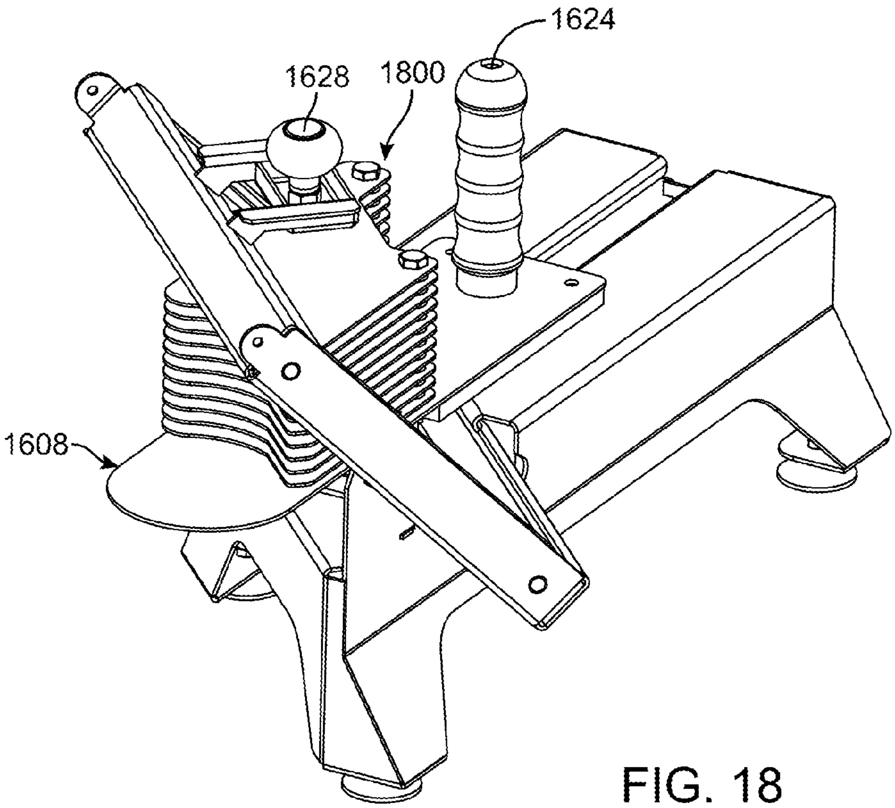
FIG. 18 is an isometric top/end view of the slicer of FIG. 16 from another vantage point, showing the cantilevering of the blade cartridge over a beveled end of the slicer.
Figure 22:
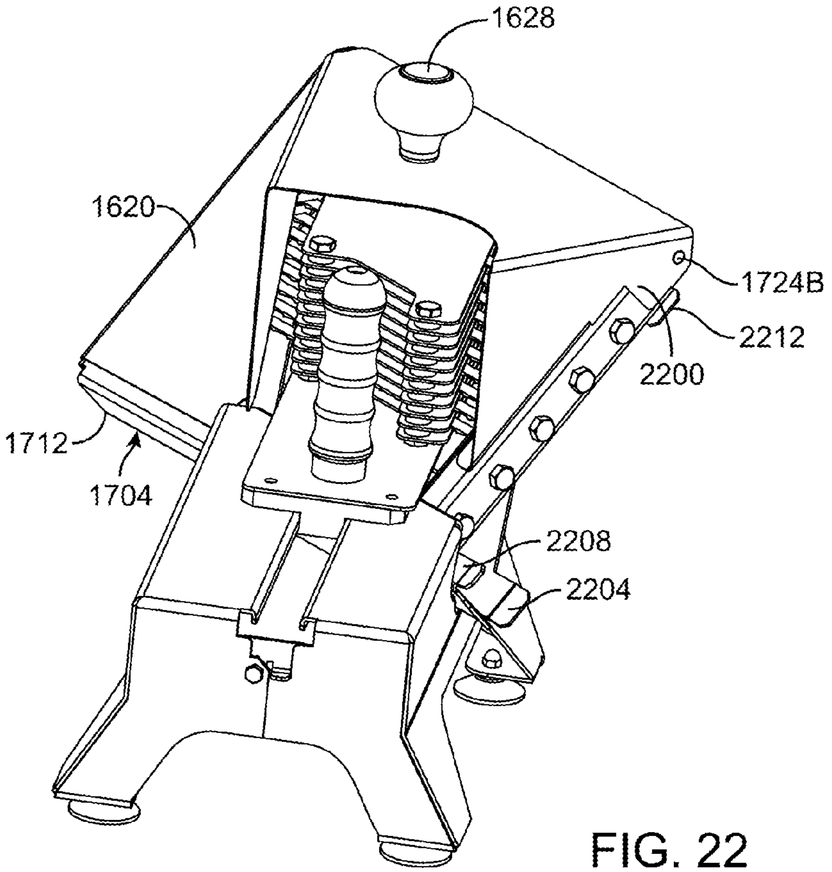
FIG. 22 is an isometric top/end partial view of the slicer of FIG. 16, showing features of the safety shield.
Figure 23:
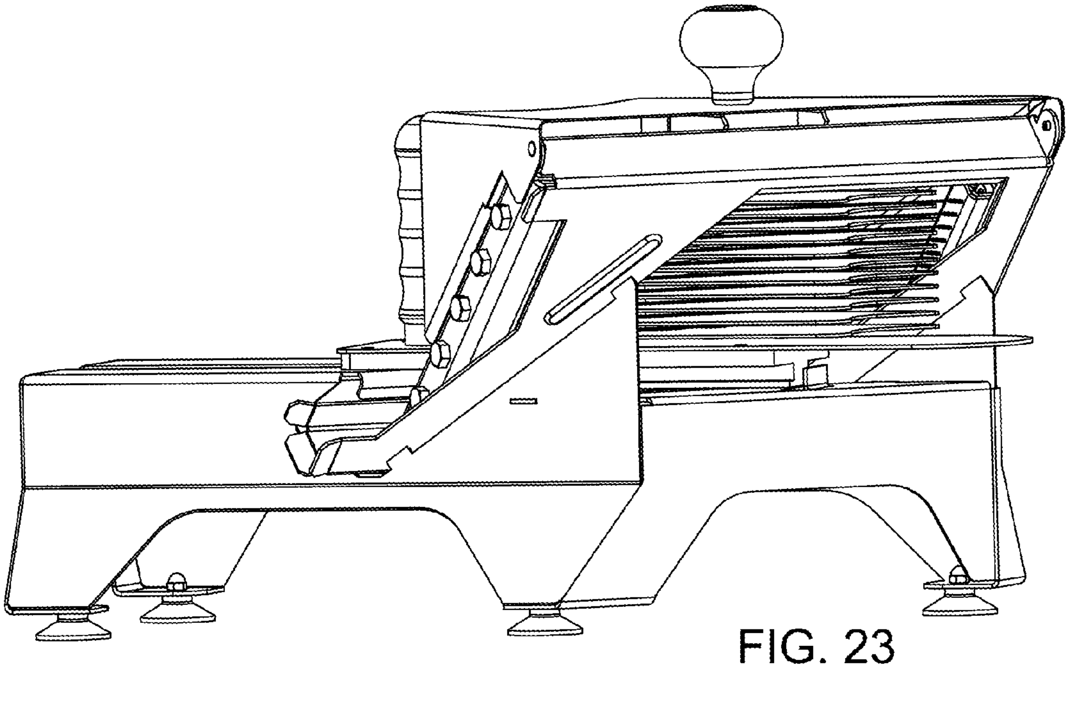
FIG. 23 is an enlarged end/side partial view of the slicer of FIG. 16 showing the safety shield and features from a different perspective relative to FIG. 22.

In the context of slicer 1600 of FIG. 16, blade-cartridge lock 1620 has already been introduced. However, its various functions are described here. As seen in FIG. 17, blade cartridge 1612 is engaged in a blade-cartridge holder 1704 that is seated in a double-beveled receptacle 1710 within base 1604. Holder 1704 includes a frame 1712 that allows blade cartridge 1612 to be inserted and removed from the holder from the backside (relative to the vantage point of FIG. 17) of slicer 1600. A handle mount 1716 is fixedly secured to frame 1712 for threadedly receiving second handle 1628 when blade-cartridge lock 1620 is in place. In this example, blade-cartridge lock 1620 (see FIG. 22) is pivotably attached to frame 1712 via pivot pins 1724A and 1724B. As also seen in FIG. 22, blade-cartridge lock 1620 includes a stop 2200 that, when the blade-cartridge lock is in its closed position as shown in FIG. 22 prevents blade cartridge 1612 from being removed. In addition, and as also shown in FIG. 22, frame 1712 includes insertion guides 2204, 2208, and 2212 that assist a user in inserting blade cartridge 1612 into holder 1704 when blade-cartridge lock 1620 is open. It is noted that none of the figures show blade-cartridge lock 1620 in an open position. Rather some of the figures, such as FIGS. 18-21, show it completely removed. However, it can remain attached and simply be pivoted out of the way about pivot pins 1724A and 1724B. When blade-cartridge lock 1620 is removed or pivoted out of the way, second handle 1628 is not present, essentially disabling slicer 1600 for use. Blade-cartridge lock 1620 is secured in its locked position (FIGS. 16, 22, and 23) by second handle 1628 being tightly screwed to handle mount 1716 (FIG. 17) through an aperture (not shown) in the blade-cartridge lock.

Integrated Blade Cartridge Wash Guard

The blade cartridge of a cartridge-based slicer can be provided with an integrated safety guard/wash guard that a user can readily secure to the blade cartridge before the user removes the cartridge from the slicer. As those skilled in the art will readily appreciate, such a guard inhibits someone handling the blade cartridge from getting cut by the blades and also inhibits the cutting edges from being damaged from handling and washing when the cartridge is removed from the slicer. In the context of exemplary slicer 100 of FIG. 1, as seen in FIGS. 14 and 15, the user can install a wash guard 1400 (FIG. 14) onto blade cartridge 108 after opening cartridge lock 1508 (FIG. 15). In the example shown, wash guard 1400 is a generally J-shaped body, the longer side of which fits over the cutting-edge side of blades 900 (not seen in FIGS. 14 and 15, but see, for example, FIG. 9), that is secured to blade cartridge 108 with a locking screw 1404 (FIGS. 14 and 15) having a knurled head 1408. Wash guard 1400 includes openings 1412 that allows water to pass through during washing of blade cartridge 108.

Figure 19:
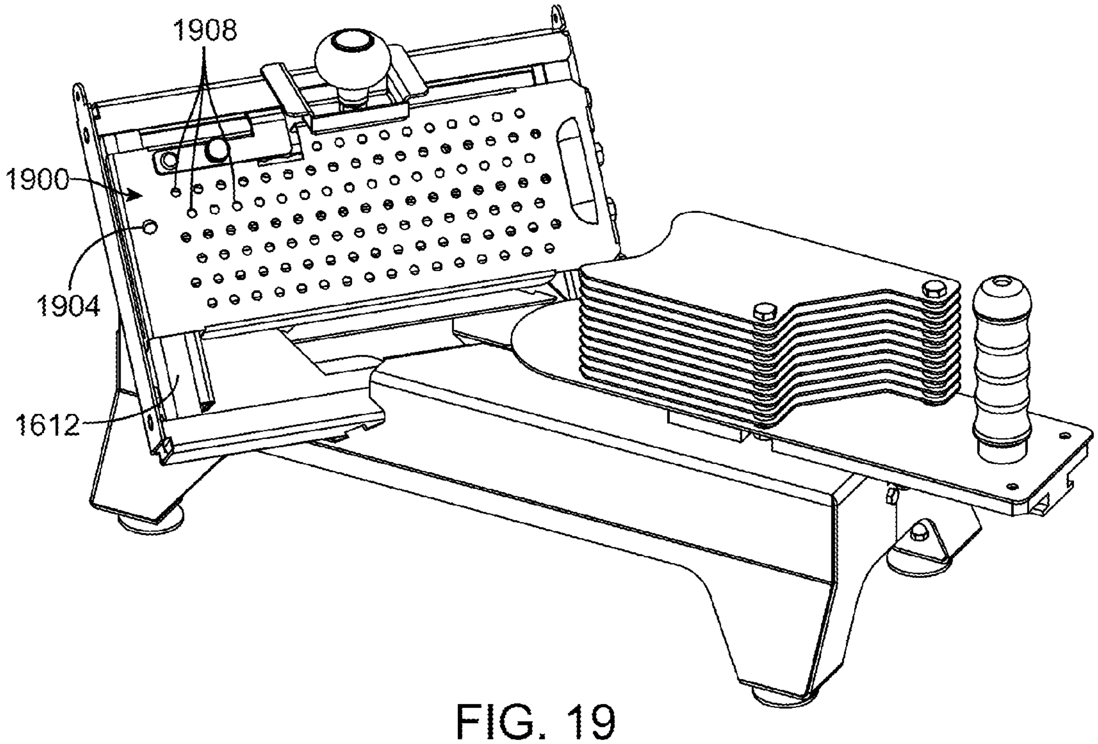
FIG. 19 is an isometric top/side view similar to the view of FIG. 17, but showing a safety guard attached to the blade cartridge.
Figure 20:
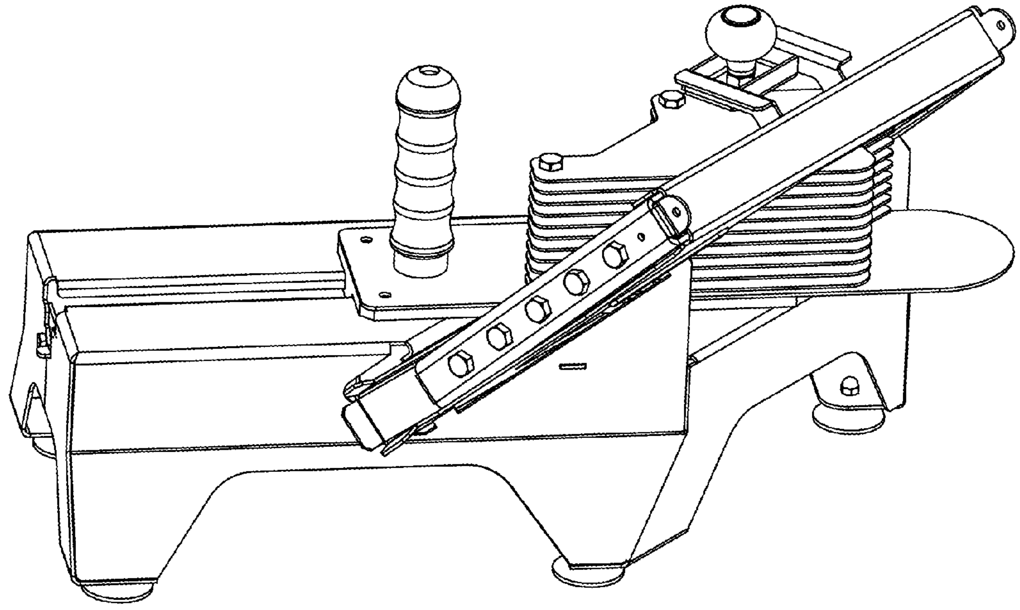
FIG. 20 is an isometric side/top view of the slicer of FIG. 16, showing the cantilever of the double-bevel blade cartridge from a different perspective relative to other figures.

As another example and in the context of slicer 1600 of FIG. 16, a user can install a wash guard 1900 (FIG. 19) onto blade cartridge 1612 after removing blade cartridge lock 1620 (FIG. 16) but prior to removing the blade cartridge from the slicer. Similar to wash guard 1400 of FIGS. 14 and 15, wash guard 1900 of FIG. 19 is generally J-shaped, and is secured to blade cartridge 1612 using a locking screw 1904. Wash guard 1900 also similarly has openings 1908 that allows water to pass through during washing of blade cartridge 1612.

Removable Blade Cartridge having Multiple Blade Levels

Figure 11:
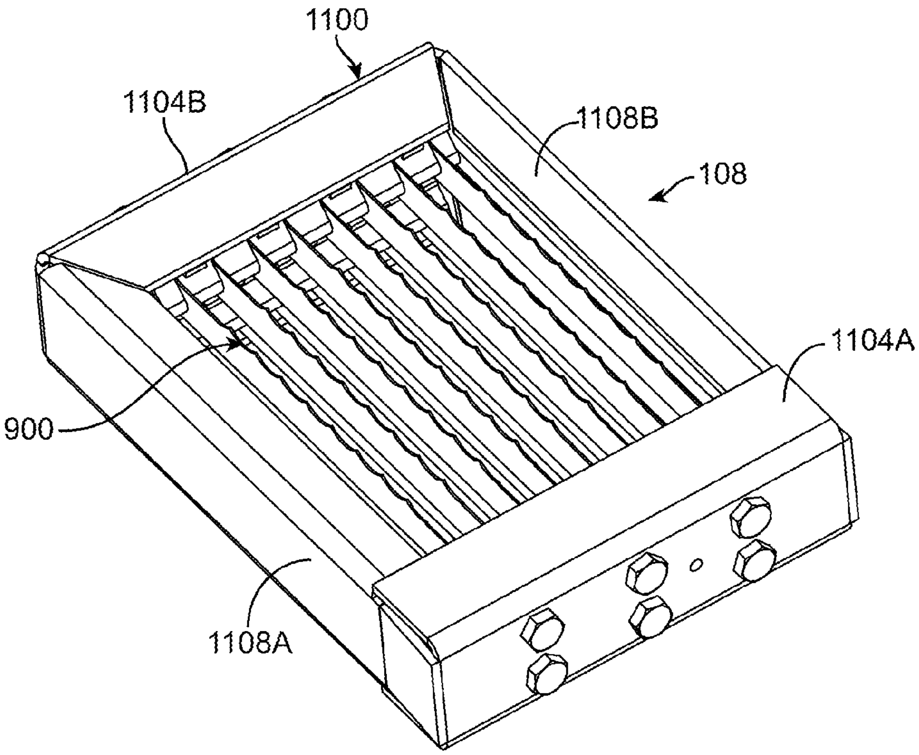
FIG. 11 is an isometric top view of a dual-level blade cartridge usable with a universal slicer of the present disclosure.
Figure 12:
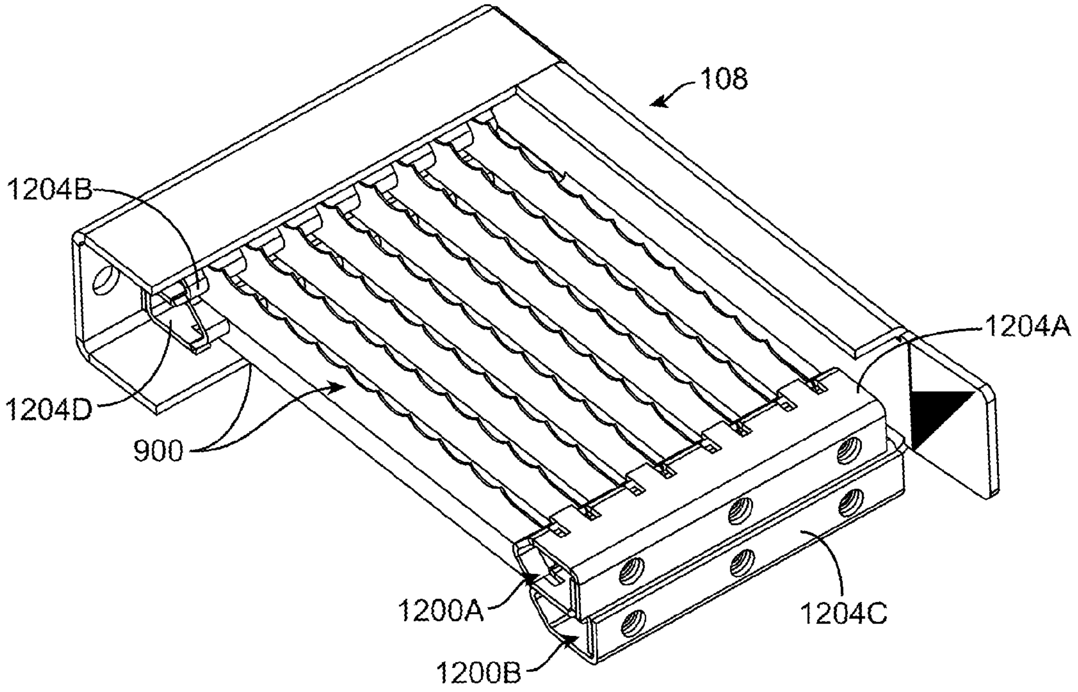
FIG. 12 is an enlarged isometric sectional top view of the blade cartridge of FIG. 11, showing the blade-holding tensioning members.
Figure 13:
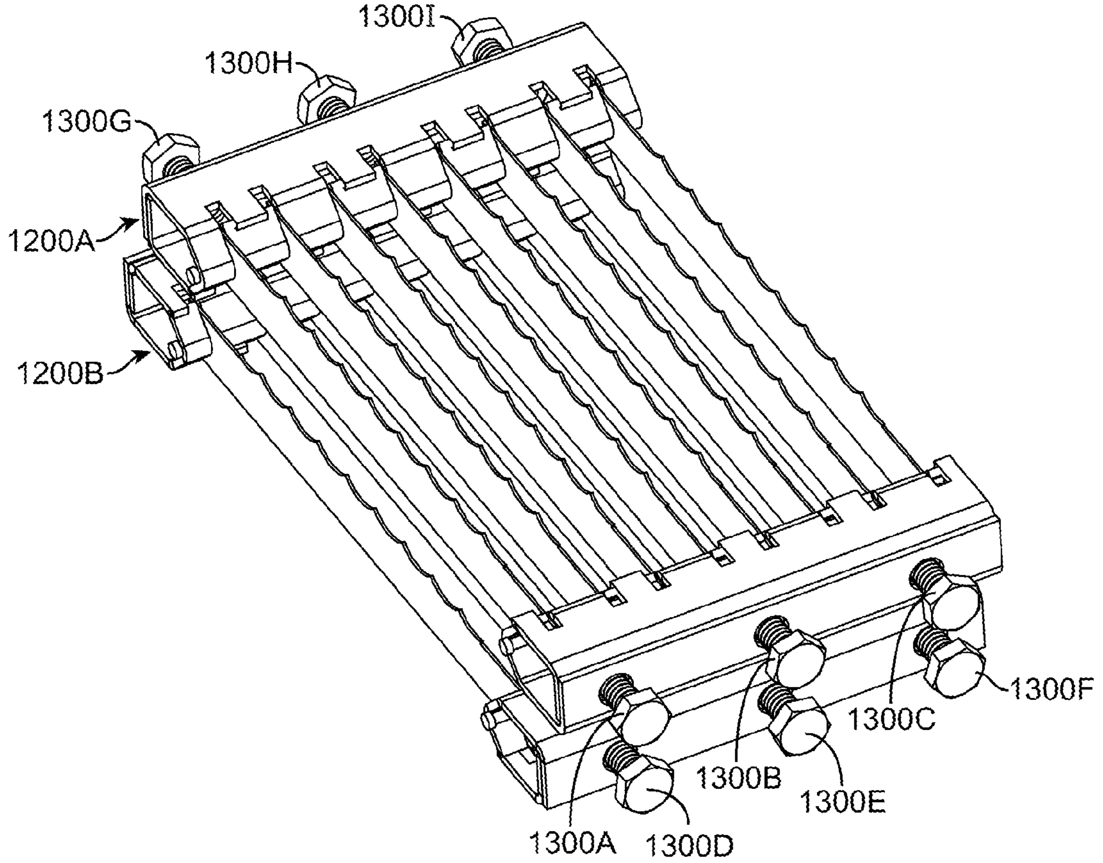
FIG. 13 is an isometric top view of the upper and lower blade assemblies of the blade cartridge of FIGS. 11 and 12.

Conventionally, slicers having multiple blade levels typically have multiple removable cartridges, one for each blade level. However, the present disclosure includes a single removable blade cartridge having multiple blade levels integrated into the single cartridge and in which the blades on all of the multiple levels are tensioned by the same cartridge frame. An example of this is shown in FIGS. 11-13 in the context of slicer 100 of FIG. 1. Referring to FIG. 12, which best illustrates a dual-blade-level, unified cartridge concept, blade cartridge 108 is shown as including two blade-level assemblies 1200A and 1200B, each comprising multiple blades 900 tensioned between two tensioning assemblies 1204A to 1204D. In this example, tensioning assemblies 1204A to 1204D are made of sheet metal that is first cut to size and punched with appropriately sized openings to receive the blades therethrough and the bent to the desired cross-sectional shape, here, an elongated D-shape. Making tensioning assemblies 1204A to 1204D out of sheet metal in this manner can result in robust, yet cost effective assemblies. Those skilled in the art will readily appreciate that cross-sectional shapes other than the D-shape can be used, such as square, rectangular, and triangular, among others. An interdigitating-type alternative to the particular tensioning assemblies 1204A to 1204D shown in FIG. 12 is described in the next section in detail. It is noted, however, that while these specific tensioning assemblies 1204A to 1204D are shown in the figures, other tensioning means can be used. As seen in FIG. 13, each blade-level assembly 1200A and 1200B has three tensioning bolts on each end, for a total of 12 bolts 1300A to 1300L (only 9 bolts 1300A to 1300I are visible in FIG. 13). As seen in FIG. 11, blade cartridge 108 includes a frame 1100 comprising a pair of end members 1104A and 1104B and a pair of side members 1108A and 1108B extending between the end members. In assembled blade cartridge 108, bolts 1300A to 1300L extend through end members 1104A and 1104B of the blade cartridge and threadedly engage corresponding respective tensioning assemblies 1204A to 1204D, and tension is induced into blades 900 by tightening various ones of bolts 1300A to 1300L to stretch the blades between the end members of frame 1100, placing side members 1108A and 1108B into counteracting compression. In other embodiments, tensioning of blades 900 can be effected in another manner.

Interdigitating Blade-Tensioning Members

In the foregoing example of dual-blade-level cartridge 108, each blade-level assembly 1200A and 1200B is shown as having corresponding particular blade-tensioning assemblies 1204A to 1204D. As noted above, each of these blade-tensioning assemblies 1204A to 1204D can alternatively be composed of a pair of interdigitating members in a manner similar to the interdigitating members 2704 and 2708 shown in FIG. 27. After reading the following description of interdigitating members 2704 and 2708 of FIG. 27 and how they form each of the tensioning assemblies 2500A and 2500B of FIG. 25, those skilled in the art will readily understand the changes that would be made to accommodate the arrangement of blades 900 in each of blade-level assemblies 1200A and 1200B.

Figure 27:
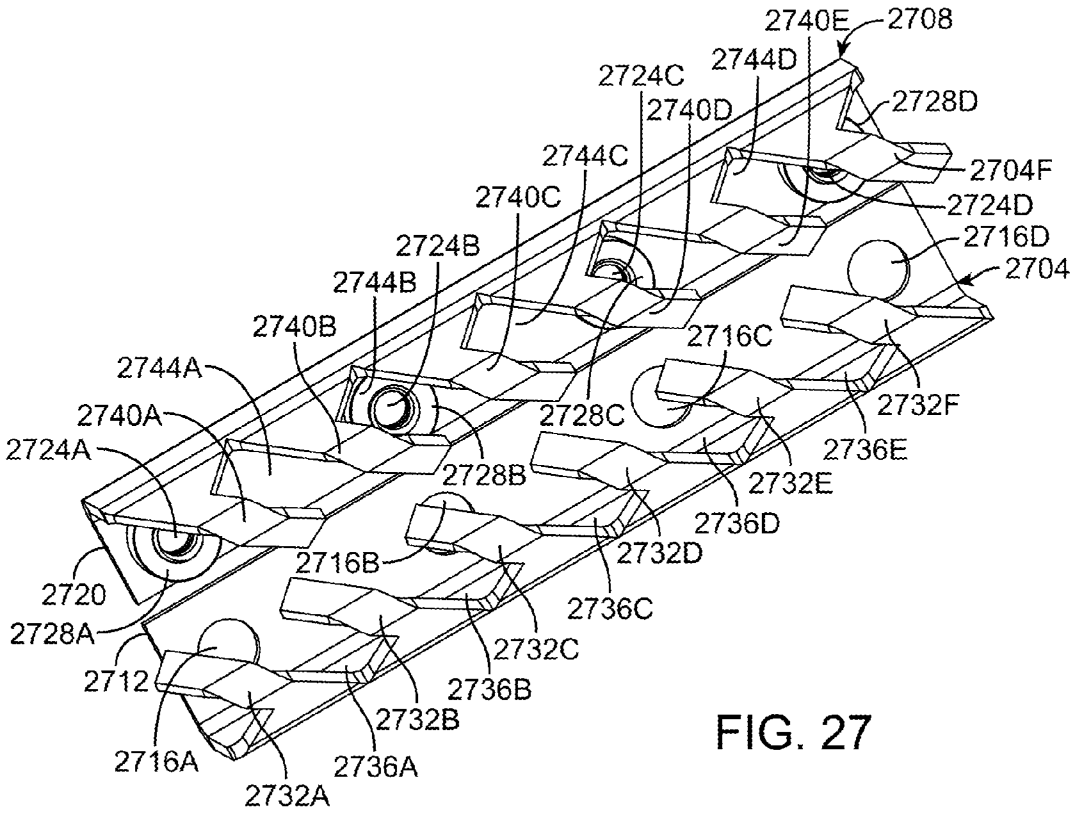
FIG. 27 is an exploded perspective view of a pair of interdigitating blade tensioning members not in their interdigitated state.

Referring to FIG. 27, interdigitating member 2704 includes a base 2712 having a plurality of non-threaded apertures 2716A to 2716D that allow the shafts (not shown) of corresponding respective tensioning bolts 2504A to 2504H (FIG. 25) to pass therethrough. Interdigitating member 2708 similarly includes a base 2720, which has four threaded apertures 2724A to 2724D, which in this example are located at bosses 2728A to 2728D to provide additional robustness due to the relatively thin nature of base 2720. Indeed, a benefit of tensioning assemblies 2500A and 2500B (FIG. 25) is that interdigitating members 2704 and 2708 can be readily fabricated, if desired, from sheet metal using standard sheet-metal-forming techniques, which can result in significant manufacturing economy.

As those skilled in the art will readily understand, in each of finished tensioning assemblies 2500A and 2500B (FIG. 25), base 2720 (FIG. 27) overlays base 2712 so that bosses 2724A to 2724D are visible and threaded apertures 2724A to 2724D are in registration with non-threaded apertures 2716A to 2716D. With apertures 2724A to 2724D and 2716A to 2716D in registration with one another, corresponding ones of tensioning bolts 2504A to 2500H (FIG. 25) can be inserted through the non-threaded apertures and threadedly engaged with the threaded apertures.

Interdigitating member 2704 includes a plurality of fingers 2732A to 2732F and a plurality of notches 2736A to 2736E, and interdigitating member 2708 similar includes a plurality of fingers 2740A to 2740F and a plurality of notches 2744A to 2744E. In this example, fingers 2732A to 2732F and 2740A to 2740F and notches 2736A to 2736E and 2744A to 2744E are configured so that blades 1616 (FIGS. 24 and 25) are beveled relative to the plane of the frame 2400. However, in other embodiments, the fingers and notches can be configured so that the blades are perpendicular to the plane of frame 2400 (FIG. 4). Those skilled in the art will readily appreciate that the widths of fingers 2732A to 2732F and 2740A to 2740F and notches 2736A to 2736E and 2744A to 2744E are selected to provide the desired spacing of blades 1616 (FIGS. 24 and 25) and so that immediately adjacent ones of the fingers are spaced from one another by about the thickness of the blade that will extend therebetween. In the example shown in FIGS. 26 and 27, ends of fingers 2732A to 2732F and 2740A to 2740F abut corresponding respective bases of notches 2736A to 2736E and 2744A to 2744E. In some embodiments, each finger end and each corresponding notch base can be secured together, for example, by spot welding, adhesive bonding, etc., to further strengthen the tensioning assembly.

Figure 24:
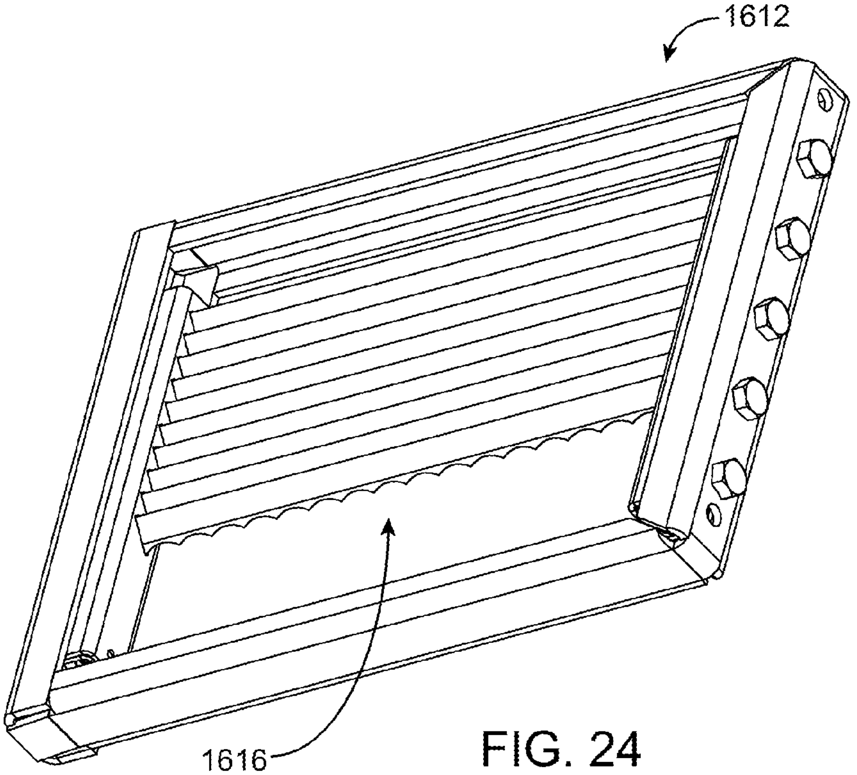
FIG. 24 is a perspective view of the blade cartridge of the slicer of FIG. 16.
Figure 25:
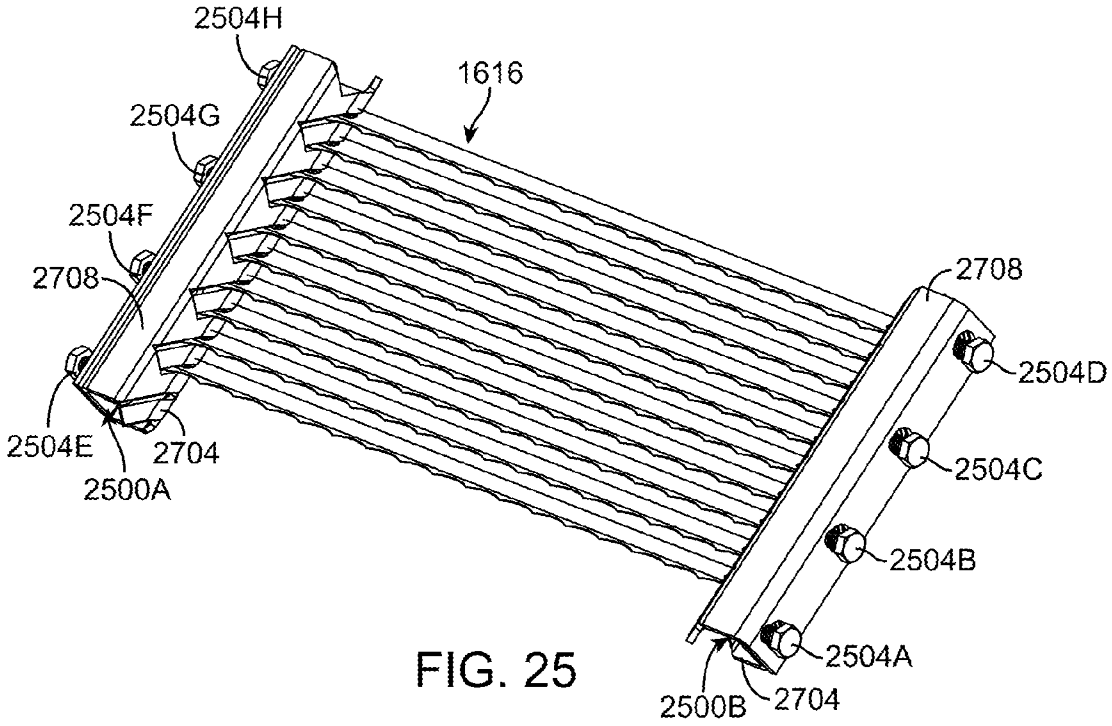
FIG. 25 is an enlarged perspective partial view of the blade cartridge of FIG. 24 showing the cartridge with portions removed.
Figure 26:
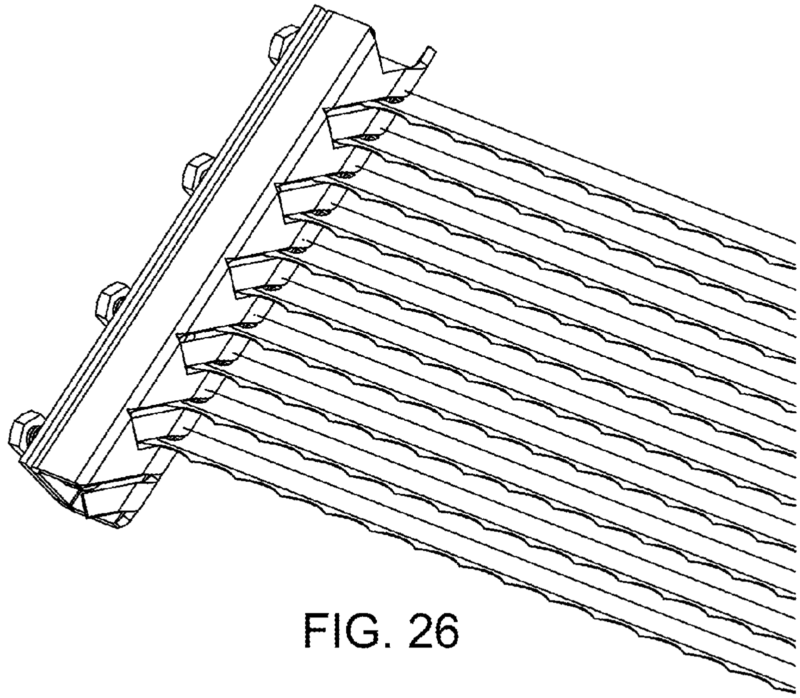
FIG. 26 is a further enlarged perspective partial view of the blade cartridge of FIG. 24 showing one set of interdigitating blade tensioning members in more detail.

Referring to FIG. 25, although not shown, each blade 1616 in this example include an aperture near each of its ends, and an elongate end pin is inserted through all of the apertures inside the corresponding one of tensioning assemblies 2500A and 2500B. Consequently, when blade cartridge 1612 (FIG. 24) is fully assembled and tensioned, fingers 2732A to 2732F and 2740A to 2740F (FIG. 27) of each tensioning assembly 2500A and 2500B engage the corresponding end pin and induce tension into blades 1616 via the two end pins. In other embodiments, an arrangement different from the end-pin arrangement just described can be used.

Figure 28:
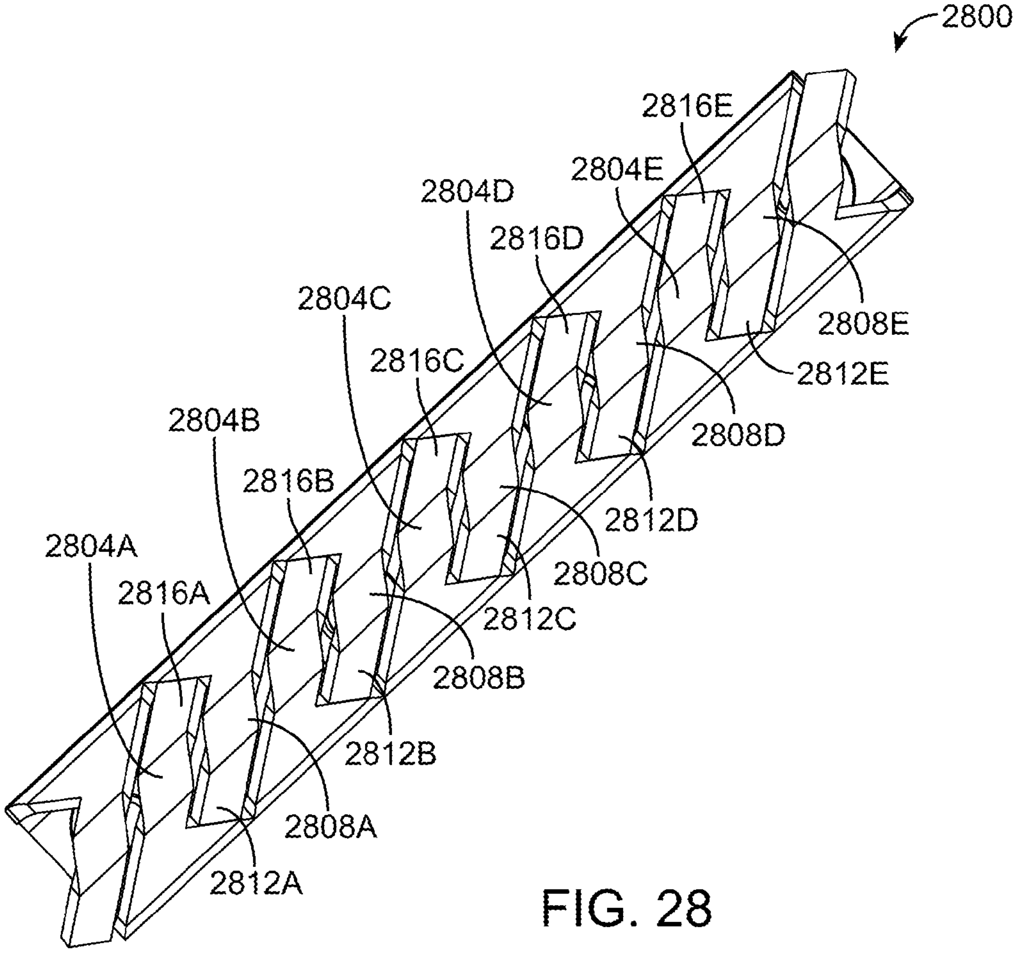
FIG. 28 is front view of an alternative blade tensioning assembly composed of a pair of interdigitating blade tensioning members.
Figure 29:
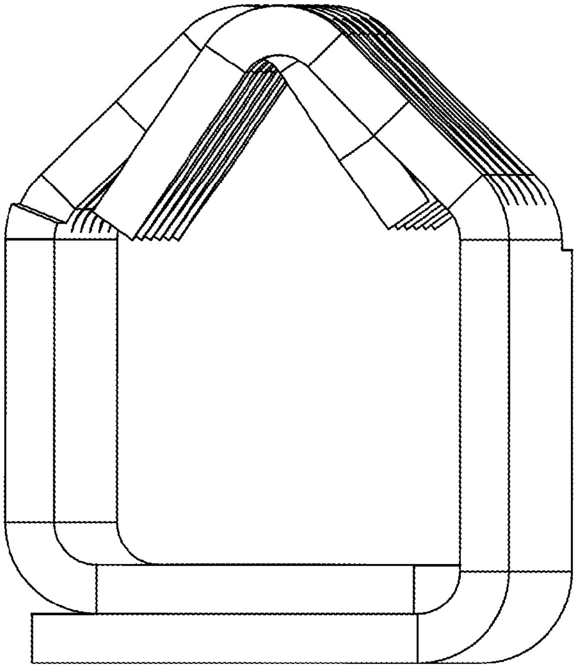
FIG. 29 is an enlarged cross-sectional perspective view of the blade tensioning assembly of FIG. 28.

FIGS. 28 and 29 illustrate an alternative tensioning assembly 2800 that not only utilizes interdigitating fingers 2804A to 2804E and 2808A to 2808E like tensioning assemblies 2500A and 2500B of FIG. 25, but also includes underlapping interdigitating fingers. By underlapping, it is meant that each finger 2804A to 2804E and 2808A to 2808E is longer than the corresponding notch 2812A to 2812E and 2816A to 2816E and the additional length extends under the base of that notch. This underlapped configuration provides additional strength to assembly because of the additional force that would be needed to disengage underlapped fingers 2804A to 2804E and 2808A to 2808E. For still additional strength, each finger 2804A to 2804E and 2808A to 2808E could be bonded to the opposing member 2820A or 2820B, for example, by welding or adhesive bonding.

Double-Beveled-Blade Arrangement

A food-product slicer of the present disclosure can be enhanced using a double-beveled-blade arrangement that skews the slicing blades relative to the thrust axis of the slicer and stair-steps the slicing blades relative to one another. An example of the double-beveled-blade arrangement is seen in slicer 1600 of FIGS. 16-27, and the arrangement is especially visible in FIGS. 17-20. Referring to FIG. 17, in slicer 1600, the double-beveled-blade arrangement 1702 is executed by providing blade cartridge 1612 with beveled blades 1616 and mounting the blade cartridge to base 1604 at a double-beveled orientation, i.e., an orientation resulting from a compound angle resulting from skewing the blade cartridge horizontally relative to a vertical plane containing thrust axis 1708 and tilting the blade cartridge in a direction along the thrust axis. As those skilled in the art will readily appreciate, the bevel-angle of blades 1616 in blade cartridge 1612 is determined from the skew and tilt angles of the blade cartridge and the need to keep the plane of each blade parallel to the upper surface 1712 of base 1604 along which pusher 1608 slides during the slicing process. It is noted that while the embodiment shown illustrates double-beveled-blade arrangement 1702 executed in the context of a blade-cartridge-based slicer, it can be executed in a non-cartridge design. In addition, a similar double-beveled-blade arrangement can be executed in reciprocating-blade slicers, automated slicers, and non-horizontal slicers, among others.

Beveled-Blade Cartridge

As noted immediately above, the execution of a double-beveled blade design in a blade-cartridge-based food-product slicer, such as slicer 1600 of FIGS. 16-27, results in a beveled-blade cartridge, such as blade cartridge 1612 (see, e.g., FIGS. 17 and 24). Those skilled in the art will readily understand that similar beveled-blade cartridges can be made for other slicer configurations and types as desired. It is noted that the beveling of the blades in the cartridge need not be beveled for a double-beveled-blade arrangement, but rather could be arranged, for example, for tilting only in a direction along the food-product thrust axis. Such a cartridge could be used, for example, in a hard-food-product slicing (cleaving) in a horizontal slicer in which the cartridge cantilevers over the end of the base in a manner similar to slicer 1600 of FIG. 17, but without the horizontal skewing. Such blade arrangements are easily accommodated using the interdigitating finger or underlapping interdigitating finger tensioning assemblies described above. In addition, it is noted that while blade cartridge 1612 is shown as having blades 1616 having cutting edges lying in a common plane, in other embodiments the blades can be arranged differently. Indeed, an imaginary surface containing the cutting edges of the blades in a particular cartridge can have any cross-sectional shape when that surface is cut by a plane perpendicular to the long axes of the blades. For example, such cross-sectional shape can be a V-shape with the blade(s) at or closest to the vertex being closest to the pusher prior to slicing, a V-shape with the blade(s) at or closest to the vertex being farthest from the pusher prior to slicing, a zig-zag shape, such as a W-shape, and a wavy shape, such as a sinusoidal shape, among many others, and any combination thereof. These blade arrangements, too, can easily be accommodated using the interdigitating finger or underlapping interdigitating finger tensioning assemblies described above.

Cantilevered-Blade Arrangement for a Non-Vertical Slicer

As mentioned immediately above, a horizontal food-product slicer of the present disclosure can be enhanced with a cantilevered blade design. This can be particularly useful for cantilevering at least a portion of the blade over an end, side, etc., of a base of the slicer to allow a prep pan to be placed at least partially underneath the blades to catch product slices that have been sliced by the blades. In the context of slicer 1600 of FIGS. 16-27, this cantilevering of the blades is seen best in FIGS. 18, 20, and 21, and especially FIG. 21 which shows prep pan 2100 positioned partially underneath blade cartridge 1612 for catching food-product slices (not shown) after they have been produced by the blade cartridge. It is noted that the cantilevered arrangement need not be implemented in a double-beveled-blade arrangement, as it can similarly be implemented in a single-bevel arrangement, such as the hard-product-slicer embodiment described briefly in the immediately previous section. Nor does the cantilevered-blade arrangement need to be implemented in a blade-cartridge context. In addition, it is noted that a slicer utilizing a cantilevered-blade arrangement need not be horizontal, since, as those skilled in the art will appreciate, the benefits from cantilevering can be obtained at non-horizontal orientations as well. As with other blade arrangements disclosed herein, the cantilevered-blade arrangement can also be used with reciprocating blades, automated slicers, and hard- and soft-food-product slicers, among others.

Additional Exemplary Embodiments

A unique camming action is described above in connection with universal food-product slicer 100 of FIGS. 1-15 that induces a combined slicing and cleaving action as between the food-product and the blade set. This combined action is particularly described above in connection with FIGS. 6 and 7. It is noted above that this camming action need not necessarily result from a pusher having a camming region designed and configured to induce that combined slicing and cleaving action. Indeed, FIGS. 32 and 33 illustrate a universal food-product slicer 3200 that illustrates one alternative for inducing a combined slicing and cleaving action into a food-product.

Figure 32:
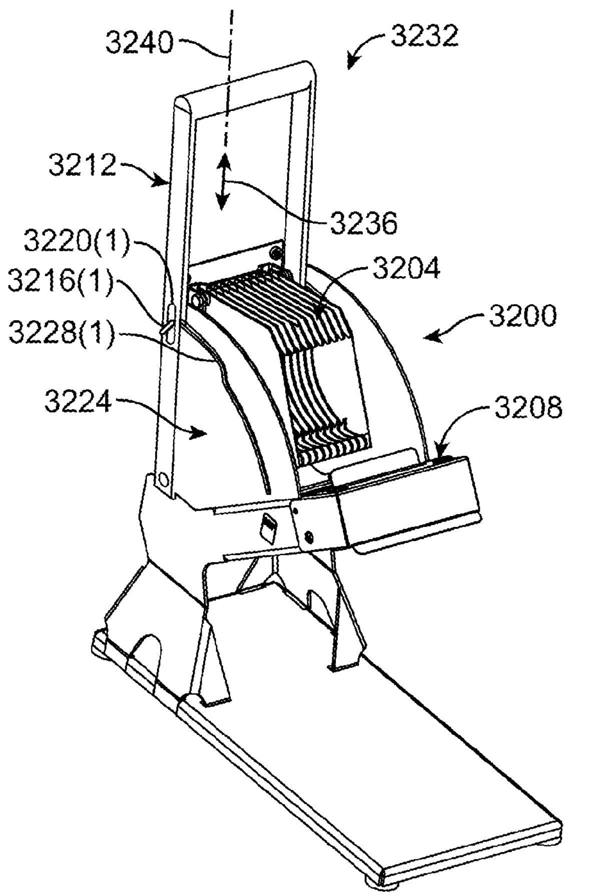
FIG. 32 is a perspective view of a universal food-product slicer having a cam-follower arrangement for moving a pusher in a manner that imparts a combined slicing and cleaving action into a food-product during cutting, showing the actuator arm in an open position.
Figure 33:
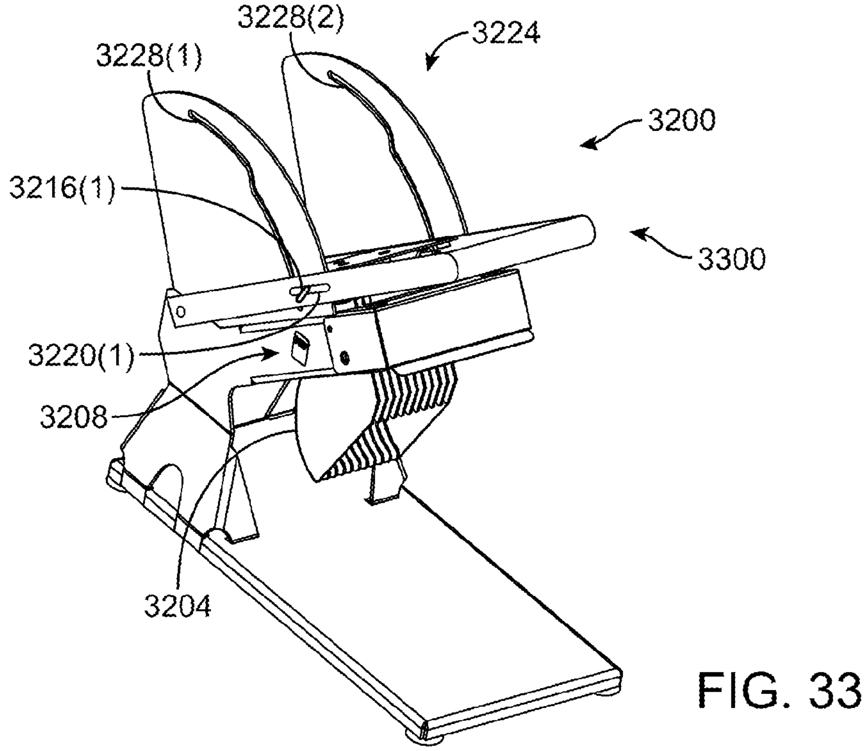
FIG. 33 is a perspective view of the universal food-product slicer of FIG. 32, showing the actuator arm in a closed position.

Referring to FIGS. 32 and 33, universal food-product slicer 3200 includes a pusher 3204 movable relative to a blade set 3208, in this example, via an actuator arm 3212 coupled to the pusher via a pair of cam followers 3216(1) and 3216(2) (only follower 3216(1) is visible in the figures) each fixed at one end to the pusher and movable engaged with the actuator arm via corresponding respective slots 3220(1) and 3220(2) (only slot 3220(1) is visible in the figures) in which each cam followers can moved freely along the long axis of that slot. Food-product slicer 3200 also includes a camming arrangement 3224 having a pair of cam slots 3228(1) and 3228(2) in which cam followers 3216(1) and 3216(2) are slidingly engaged. As those skilled in the art will readily understand, when a user moves actuator arm 3212 between an open position 3232 (FIG. 32) and a closed position 3300 (FIG. 33), cam followers 3216(1) and 3216(2) follow the contours of corresponding respective cam slots 3228(1) and 3228(2) and also move relative to the actuator arm by moving within corresponding respective slots 3220(1) and 3220(2). Correspondingly, pusher 3204 is coupled to actuator arm 3212 in a way that it can move, as cam followers 32316(1) and 3216(2) follow cam slots 3228(1) and 3228(2), in a direction 3236 parallel to the longitudinal axis 3240 of the actuator arm. When food-product (not show) is captured between pusher 3204 and blade set 3208, this movement of the pusher is such that the food-product is moved by the pusher to create a combined slicing and cleaving action as between the food-product and the blade set. Those skilled in the art will readily appreciate that the shapes of pusher 3204 and cam slots 3228(1) and 3228(2) may be designed together to achieve the combined slicing and cleaving action at the appropriate times during a cutting operation so that the best cutting results are achieved. In one embodiment, the shapes of pusher 3204 and cam slots 3228(1) and 3228(2) may be designed to impart the food-product motion illustrated in FIGS. 6 and 7, described above. Other components of universal slicer 3200 of FIGS. 32 and 33, such as blade set 3208 and base 3244 can be the same as or similar to the corresponding features of universal slicer 100 of FIGS. 1-15.

Figure 34:
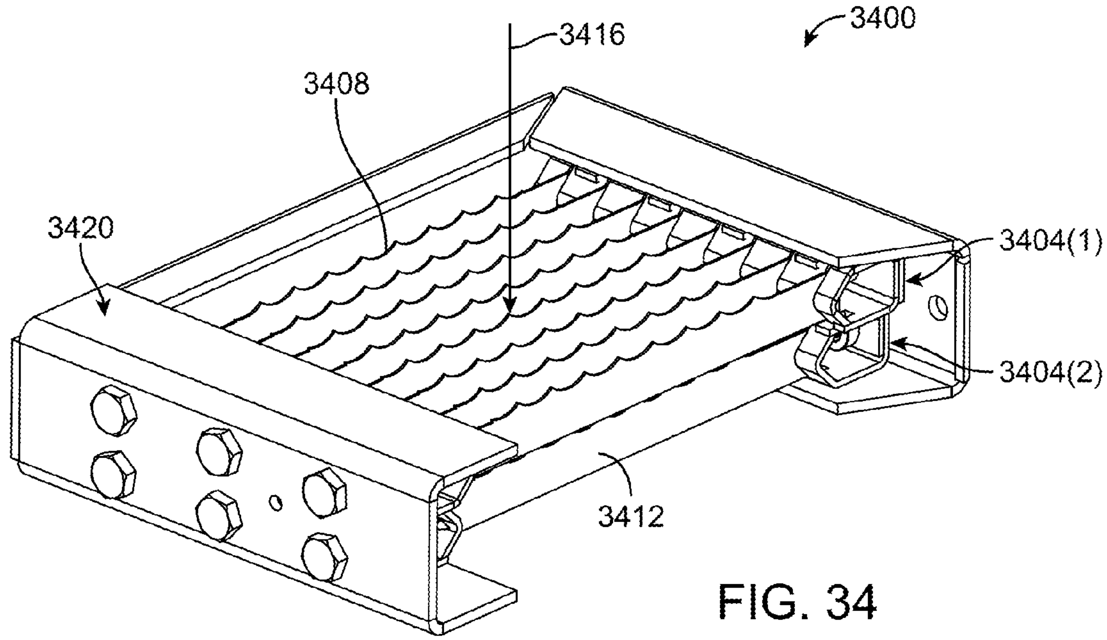
FIG. 34 is a perspective partial view of a multilevel blade cartridge having two blade levels.
Figure 35:
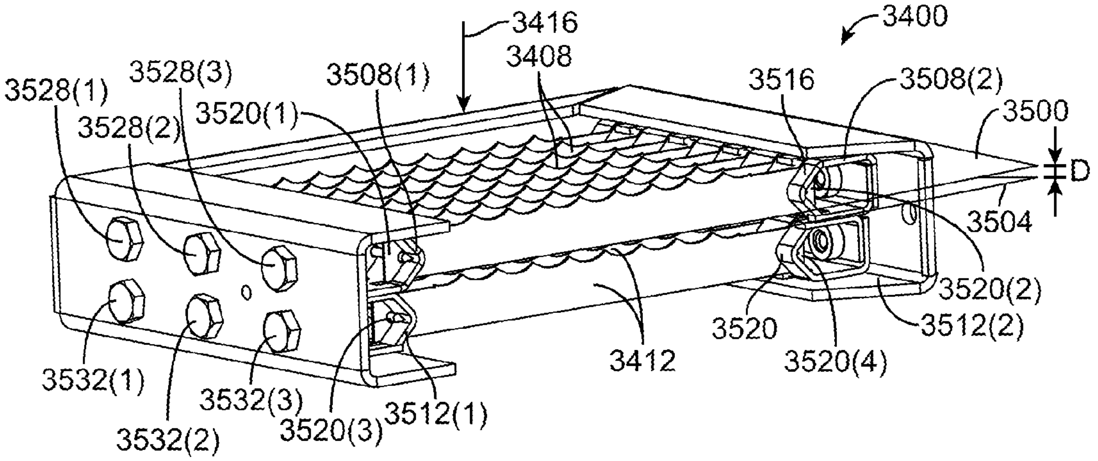
FIG. 35 is a perspective partial view of the multilevel blade cartridge of FIG. 34, showing the separation between the blades on the differing levels.

FIGS. 34 and 35 illustrate a multilevel blade cartridge 3400 suitable for use with a food-product slicer, such as either of universal food-product slicers 100 and 3200 described above. As can be readily appreciated by those skilled in the art, universal food-product slicers, which need to be very robust to handle hard food-products, require very robust blade sets with highly tensioned blades to handle the large forces encountered during cutting operations. Multi-level blade cartridge 3400 provides such a robust design. Referring to FIGS. 34 and 35, cartridge 3400 is a bi-level cartridge having first and second blade levels 3404(1) and 3404(2), respectively. In this example, cartridge 3400 is particularly designed and configured for soft food-product, which as noted above benefits from slicing action to inhibit squashing of the soft food-product.

Each blade level 3404(1) and 3404(2) includes a plurality of blades 3408 and 3412 (only a few of each labeled for convenience), each of which is serrated to assist in slicing. As mentioned immediately above and elsewhere herein, slicing is particularly useful for slicing soft food-product. Blades 3408 and 3412, however, are relatively short and robust, making them also suitable for standing up to the rigors of cleaving hard food-products. As best seen in FIG. 35, blades 3408 on first blade level 3404(1) are spaced from blades 3412 on second blade level 3404(2) in a direction parallel to cutting axis 3416, with a plane 3500 defined by the tips of blades 3412 on second blade level 3404(2) being spaced by a distance, D, from a plane 3504 defined by the trailing edges of blades 3408 on first blade level 3404(1). As described above, this is beneficial to keep slices of food-product, especially of hard food-product, from binding within blade cartridge 3400 by increasing the ratio of open area to total area on each of first and second blade levels 3404(1) and 3404(2).

Multilevel blade cartridge 3400 includes a robust frame 3420 that allows blades 3408 and 3412 to be highly tensioned. In the embodiment shown and as best seen in FIG. 35, blades 3408 on first blade level 3404(1) are held at opposing ends by corresponding respective blade holders 3508(1) and 3508(2), and blades 3412 on second blade level 3404(2) are held at opposing ends by corresponding respective blade holders 3512(1) and 3512(2). Blades 3408 are laterally constrained by corresponding respective slots 3516 (only one labeled for convenience) in blade holders 3508(1) and 3508(2), and, likewise, blades 3412 are laterally constrained by corresponding respective slots 3520 (only one labeled for convenience) in blade holders 3512(1) and 3512(2). Blades 3408 and 3412 are held longitudinally by corresponding respective pins 3524(1) to 3524(4) that extend through apertures in the blades. Blades 3408 are tensioned using tensioning screws 3528(1) to 3528(3) that extend through frame 3428 to threadingly engage blade holder 3508(1) and a similar set of tensioning screws (not shown) on the opposite end of the frame. Likewise, blades are tensioned using tensioning screws 3532(1) to 3532(3) that extend through frame 3420 to threadingly engage blade holder 3512(1) and a similar set of tensioning screws (not shown) on the opposite end of the frame.

Figure 36:
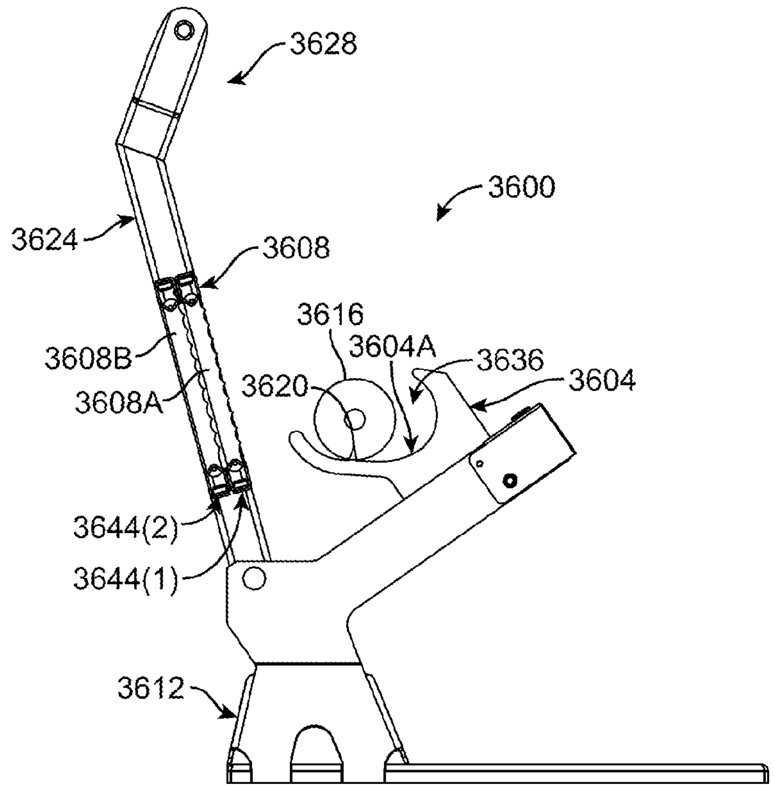
FIG. 36 is a side elevational view of a universal food-product slicer having a fixed product pusher and a movable blade set, showing the actuator arm in an open position.
Figure 37:
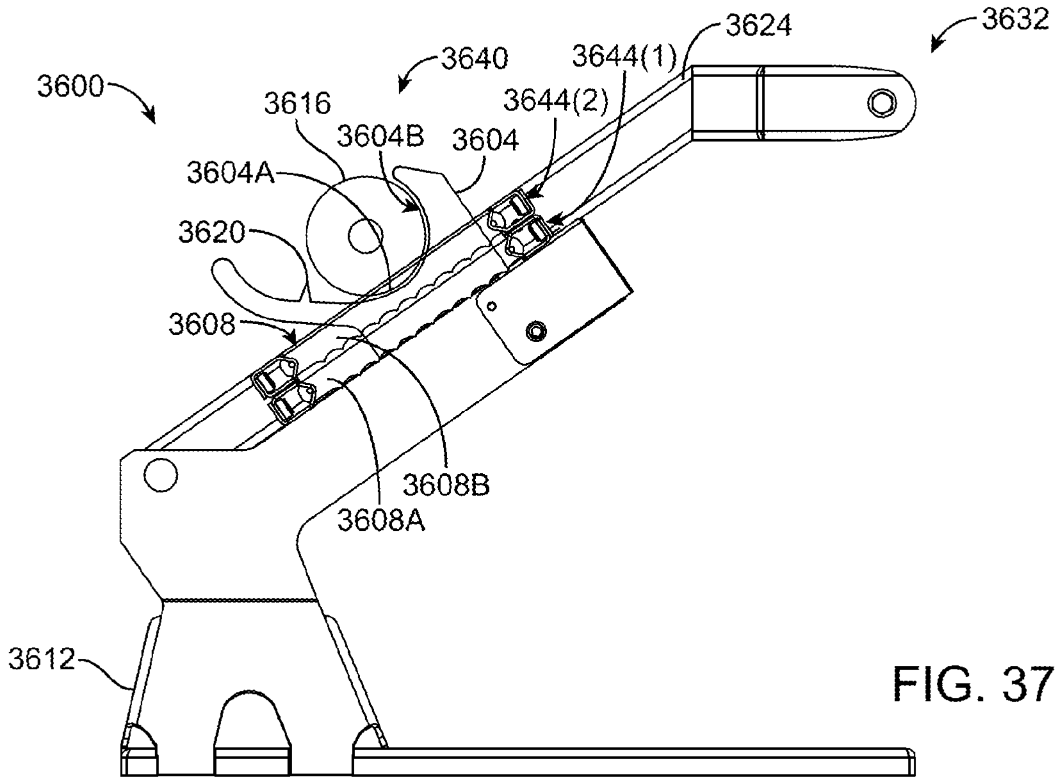
FIG. 37 is side elevational view of the universal food-product slicer of FIG. 36, showing the actuator arm in a closed position.

FIGS. 36 and 37 illustrate another embodiment of a universal food-product slicer 3600 made in accordance with the present invention. Slicer 3600 differs from slicer 100 of FIGS. 1-15 in that the movability of pusher 3604 and blade set 3608 are reversed relative to combined pusher-cradle 124 and blade set 108A of slicer 100. In slicer 3600 of FIGS. 36 and 37, pusher 3604 is fixed relative to a fixed base 3612 and blade set 3608 is movable relative to the fixed base and the fixed pusher. Pusher 3604 includes a camming portion 3604A that, when blade set 3608 is moved into contact with a food product 3616 being held by the pusher (in this embodiment camming portion 3604A also acts as a cradle of sorts to hold the food-product) and then into the food-product, the advancing motion of the blade set and the contour of the camming portion result in a combined slicing and cleaving interaction between the blade set and the food product in a manner similar to the interaction between combined pusher-cradle 124 and blade set 108A of slicer 100 of FIGS. 1-15. In one example, the contour of camming portion 3604A is elliptical, though other contours are possible.

In the embodiment shown, camming portion 3604A includes one or more food-product stabilizers, here spikes 3620 (one seen because of the nature of the side view), that pierce food-product 3616 to assist in holding the food-product in place prior to cutting. As seen in FIGS. 36 and 37, in this embodiment blade set 3608 is movable using an lever-arm 3624 actuated by a human user (not shown). FIG. 36 shows lever arm 3624 in an open position 3628 in which food-product 3616 can be placed into camming region 3604A on spikes 3620, and FIG. 37 shows lever arm 3624 in a closed position 3632 after food-product 3616 has been cut by blade set 3608. Note the difference in the position 3636 of food-product 3616 in FIG. 36 relative to the position 3640 of the food-product in FIG. 37. In position 3636 of FIG. 36, food-product 3616 is resting in a ready-for-cutting position, stabilized by piercing spikes 3620. After the "closing" of lever arm 3624 to effect slicing, food product 2616, now in the form of multiple slices after being cut by blades 3608A and 3608B (only two visible on differing blade levels 3644 due to the nature of the view), has been moved along the contour of camming region 3604A of pusher 3604 when it had been forced into contact with a stop region 3604B of the pusher.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A food-product slicer for slicing a food-product, comprising:

a blade set designed and configured for cutting a food-product into multiple slices, wherein said blade set includes a plurality of space-apart blades having spaces therebetween, and said blade set has an upper side and a lower side spaced from said upper side;

a food-product pusher designed, configured, and located to resistingly engage the food-product when the food-product is engaged with said blade set during cutting operations;

a food-product cradle that includes a plurality of fingers parallel to said plurality of spaced apart blades of said blade set and spaced apart so that said plurality of fingers will interdigitate with said plurality of spaced-apart blades within said spaces between said spaced apart blades during the cutting operations, said plurality of fingers having corresponding respective upper surfaces designed, configured, and located to support the food-product from beneath the food-product prior to the cutting operations and to hold the food-product in spaced relation to said food-product pusher;

a base fixedly supporting said blade set during the cutting operations; and a lever arm to which each of said food-product pusher and said food-product cradle are fixedly coupled, said lever arm pivotably coupled to said base, wherein said lever arm has:

an open position in which said food-product cradle is spaced apart entirely above said blade set and supports the food-product on said upper surfaces of said plurality of fingers in spaced relation to said blade set above said upper side of said blade set so that the food-product does not contact said blade set until a user moves said lever arm from said open position during the cutting operations; and a closed position in which said upper surfaces of said plurality of fingers of said food-product cradle are located below said lower side of said blade set;

wherein, as the user moves said lever arm from said open position to said closed position, said plurality of fingers of said food-product cradle pass through said blade set in said spaces of said blade set so that said blade set disengages the food-product from said upper surfaces of said plurality of fingers and supports the food-product as said food-product pusher subsequently makes contact with the food-product opposite said blade set.

2. The food-product slicer according to claim 1, wherein said food-product pusher and said food-product cradle are monolithically integrated into a combined pusher-cradle in which said plurality of fingers of said food-product cradle are monolithically joined to a plurality of like fingers of said food-product pusher.

3. The food-product slicer according to claim 2, wherein said combined pusher-cradle includes a camming region designed and configured to induce a slicing action into a food-product when the food-product is captured between said blade set and said combined pusher-cradle during a cutting operation.

4. The food-product slicer according to claim 3, wherein said plurality of fingers and said plurality of like fingers allow said food-product cradle and said camming region to extend into said blade set.

5. The food-product slicer according to claim 2, further comprising a pair of side housing members spaced apart on opposite sides of said combined pusher-cradle.

6. The food-product slicer according to claim 2, wherein said food-product cradle further comprises at least one product-stabilizing feature for inhibiting movement of the food-product prior to the cutting operations.

7. The food-product slicer according to claim 6, wherein said at least one product-stabilizing feature is designed and configured to pierce the food-product.

8. The food-product slicer according to claim 6, wherein said at least one product-stabilizing feature comprises non-piercing anti-roll features.

9. The food-product slicer according to claim 2, wherein said combined pusher-cradle has a loading position and said food-product cradle supports the food-product above said blade set prior to slicing operations when said combined pusher-cradle is in said loading position.

10. The food-product slicer according to claim 1, wherein said food-product cradle has a loading position and an upper side for supporting the food-product prior to slicing operations, said upper side being located above said blade set.

11. The food-product slicer according to claim 10, further comprising a pair of side housing members spaced apart on opposite sides of said food-product cradle.

12. The food-product slicer according to claim 10, wherein said food-product cradle further comprises features for inhibiting movement of the food-product prior to the cutting operations.

13. The food-product slicer according to claim 1, wherein said food-product cradle further comprises at least one feature for inhibiting movement of the food-product prior to the cutting operations.

14. The food-product slicer according to claim 13, wherein said at least one product-stabilizing feature is designed and configured to pierce the food-product.

15. The food-product slicer according to claim 13, wherein said at least one product-stabilizing feature comprises non-piercing anti-roll features.

* * * * *